(12) United States Patent
Kamata et al.

(10) Patent No.: US 7,792,972 B2
(45) Date of Patent: Sep. 7, 2010

(54) PACKET FORWARDING CONTROL METHOD AND PACKET FORWARDING APPARATUS

(75) Inventors: Masanori Kamata, Yokohama (JP); Hiroaki Miyata, Yokohama (JP); Tadashi Takahashi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 445 days.

(21) Appl. No.: 11/766,882

(22) Filed: Jun. 22, 2007

(65) Prior Publication Data

US 2008/0028077 A1 Jan. 31, 2008

(30) Foreign Application Priority Data

Jul. 27, 2006 (JP) ............... 2006-204406

(51) Int. Cl.
G06F 15/16 (2006.01)
(52) U.S. Cl. ...................... 709/227; 370/392
(58) Field of Classification Search ................ 709/227; 370/392
See application file for complete search history.

(56) References Cited

U.S. PATENT DOCUMENTS

| | | | |
|---|---|---|---|
| 6,683,885 B1 * | 1/2004 | Sugai et al. | 370/423 |
| 6,763,018 B1 * | 7/2004 | Puthiyandyil et al. | 370/352 |
| 6,954,463 B1 * | 10/2005 | Ma et al. | 370/401 |
| 7,461,152 B2 * | 12/2008 | Bird et al. | 709/227 |
| 2001/0050914 A1 * | 12/2001 | Akahane et al. | 370/382 |
| 2002/0129271 A1 * | 9/2002 | Stanaway et al. | 713/201 |
| 2002/0176414 A1 * | 11/2002 | Miki et al. | 370/389 |
| 2003/0065799 A1 * | 4/2003 | Kitamura | 709/230 |
| 2004/0165581 A1 * | 8/2004 | Oogushi | 370/352 |
| 2004/0218611 A1 * | 11/2004 | Kim | 370/401 |
| 2005/0207411 A1 * | 9/2005 | Ota et al. | 370/389 |
| 2006/0120374 A1 * | 6/2006 | Yoshimoto et al. | 370/392 |

FOREIGN PATENT DOCUMENTS

| | | |
|---|---|---|
| JP | 2004-032006 | 1/2004 |
| JP | 2006-166053 | 6/2006 |

OTHER PUBLICATIONS

IEEE P802.1ad/D2.4, Draft Standard for Local and Metropolitan Area Networks, "Virtual Bridged Local Area Networks- Amendment 4: Provider Bridges".
IEEE P802.1ah/D3.4, Draft Standard for Local and Metropolitan Area Networks, "Virtual Bridged Local Area Networks- Amendment 6: Provider Backbone Bridges".

* cited by examiner

*Primary Examiner*—Thu Nguyen
*Assistant Examiner*—Thomas J Dailey
(74) *Attorney, Agent, or Firm*—Brundidge & Stanger, P.C.

(57) ABSTRACT

In a wide area Ethernet network, an edge side gateway (EGW) acquires layer 2 tunneling control information from an authentication server when a PADI is received from a user terminal, stores the correspondence between the source address of the PADI and the layer 2 tunneling control information in its management table, encapsulates the PADI in accordance with the layer 2 tunneling control information, and transmits the encapsulated PADI packet to the wide area Ethernet network. A core side gateway (CGW) having received the encapsulated PADI packet stores the correspondence between the tunneling control information and the source address extracted from the received packet in its management table, and forwards the PADI obtained by decapsulating the received packet to a broadband access server. Thereafter, each of the EGW and CGW forward received packets for the user after converting their format by referencing to the management tables.

10 Claims, 25 Drawing Sheets

FIG. 5A

USER MANAGEMENT TABLE 17

| USER MAC ADDRESS | VLAN ID | LAYER 2 TUNNELING TYPE | S-VLAN ID | EGW MAC ADDRESS | CGW MAC ADDRESS | USER SIDE PORT NO. | L2-VPN SIDE PORT NO. |
|---|---|---|---|---|---|---|---|
| 171 | 172 | 173 | 174 | 175 | 176 | 177 | 178 |
| 00.99.c0. 58.66.00 | — | Ethernet Over Ethernet | — | 00.99.c0. 36.11.00 | 00.99.c0. 33.84.00 | 4 | 8 |
| 00.99.c0. 61.72.00 | — |  |  |  |  | 1 |  |
| ⋮ | ⋮ | ⋮ | ⋮ | ⋮ | ⋮ | ⋮ | ⋮ |

| USER MAC ADDRESS | VLAN ID | LAYER 2 TUNNELING TYPE | S-VLAN ID | EGW MAC ADDRESS | CGW MAC ADDRESS | USER SIDE PORT NO. | L2-VPN SIDE PORT NO. |
|---|---|---|---|---|---|---|---|
| 171 | 172 | 173 | 174 | 175 | 176 | 177 | 178 |
| 00.99.c0. 58.66.00 | — | Ethernet Over Ethernet | — | 00.99.c0. 36.11.00 | 00.99.c0. 33.84.00 | 4 | 8 |
| 00.99.c0. 61.72.00 | — | Ethernet Over Ethernet | — | 00.99.c0. 36.11.00 | 00.99.c0. 44.21.00 | 1 |  |
| ⋮ | ⋮ | ⋮ | ⋮ | ⋮ | ⋮ | ⋮ | ⋮ |

| USER MAC ADDRESS | VLAN ID | LAYER 2 TUNNELING TYPE | S-VLAN ID | EGW MAC ADDRESS | CGW MAC ADDRESS | USER SIDE PORT NO. | L2-VPN SIDE PORT NO. | |
|---|---|---|---|---|---|---|---|---|
| 171 | 172 | 173 | 174 | 175 | 176 | 177 | 178 | |
| 00.99.c0.58.66.00 | — | Ethernet Over Ethernet | — | 00.99.c0.36.11.00 | 00.99.c0.33.84.00 | 4 | 8 | 170-1 |
| 00.99.c0.61.72.00 | — | Ethernet Over Ethernet | — | 00.99.c0.36.11.00 | 00.99.c0.44.21.00 | 1 | 5 | 170-2 |
| ⋮ | ⋮ | ⋮ | ⋮ | ⋮ | ⋮ | ⋮ | ⋮ | |

FIG. 5D

| USER MAC ADDRESS | VLAN ID | LAYER 2 TUNNELING TYPE | S-VLAN ID | EGW MAC ADDRESS | CGW MAC ADDRESS | USER SIDE PORT NO. | L2-VPN SIDE PORT NO. | |
|---|---|---|---|---|---|---|---|---|
| 171 | 172 | 173 | 174 | 175 | 176 | 177 | 178 | |
| 00.99.c0.58.66.00 | — | Ethernet Over Ethernet | — | 00.99.c0.36.11.00 | 00.99.c0.33.84.00 | 4 | 8 | 170-1 |
| 00.99.c0.61.72.00 | — | Ethernet Over Ethernet | — | 00.99.c0.36.11.00 | 00.99.c0.44.21.00 | 1 | 5 | 170-2 |
| 00.99.c0.55.34.00 | 1 | | | | | 3 | | 170-3 |
| ⋮ | ⋮ | ⋮ | ⋮ | ⋮ | ⋮ | ⋮ | ⋮ | |

FIG. 5E

| USER MAC ADDRESS | VLAN ID | LAYER 2 TUNNELING TYPE | S-VLAN ID | EGW MAC ADDRESS | CGW MAC ADDRESS | USER SIDE PORT NO. | L2-VPN SIDE PORT NO. | |
|---|---|---|---|---|---|---|---|---|
| 00. 99. c0. 58. 66. 00 | — | Ethernet Over Ethernet | — | 00. 99. c0. 36. 11. 00 | 00. 99. c0. 33. 84. 00 | 4 | 8 | ~170-1 |
| 00. 99. c0. 61. 72. 00 | — | Ethernet Over Ethernet | — | 00. 99. c0. 36. 11. 00 | 00. 99. c0. 44. 21. 00 | 1 | 5 | ~170-2 |
| 00. 99. c0. 55. 34. 00 | 1 | EXPANDED VLAN | 2 | — | — | 3 |  | ~170-3 |
| ⋮ | ⋮ | ⋮ | ⋮ | ⋮ | ⋮ | ⋮ | ⋮ | |

Columns: 171, 172, 173, 174, 175, 176, 177, 178

FIG. 5F

| USER MAC ADDRESS | VLAN ID | LAYER 2 TUNNELING TYPE | S-VLAN ID | EGW MAC ADDRESS | CGW MAC ADDRESS | USER SIDE PORT NO. | L2-VPN SIDE PORT NO. | |
|---|---|---|---|---|---|---|---|---|
| 00. 99. c0. 58. 66. 00 | — | Ethernet Over Ethernet | — | 00. 99. c0. 36. 11. 00 | 00. 99. c0. 33. 84. 00 | 4 | 8 | ~170-1 |
| 00. 99. c0. 61. 72. 00 | — | Ethernet Over Ethernet | — | 00. 99. c0. 36. 11. 00 | 00. 99. c0. 44. 21. 00 | 1 | 5 | ~170-2 |
| 00. 99. c0. 55. 34. 00 | 1 | EXPANDED VLAN | 2 | — | — | 3 | 6 | ~170-3 |
| ⋮ | ⋮ | ⋮ | ⋮ | ⋮ | ⋮ | ⋮ | ⋮ | |

Columns: 171, 172, 173, 174, 175, 176, 177, 178

FIG. 6

PORT MANAGEMENT TABLE 18

| DOMAIN | L2-VPN SIDE PORT NO. |
|---|---|
| ISP1 | 5 |
| ISP4 | 6 |
| ISP5 | 8 |
| ⋮ | ⋮ |

FIG. 8A

USER MANAGEMENT TABLE 27-1

| USER MAC ADDRESS | VLAN ID | LAYER 2 TUNNELING TYPE | S-VLAN ID | CGW MAC ADDRESS | EGW MAC ADDRESS | L2-VPN SIDE PORT NO. | ISP SIDE PORT NO. | |
|---|---|---|---|---|---|---|---|---|
| 00. 99. c0. 30. 58. 00 | 6 | EXPANDED VLAN | 8 | — | — | 4 | 10 | ~270-11 |
| 00. 99. c0. 61. 72. 00 | — | Ethernet Over Ethernet | — | 00. 99. c0. 44. 21. 00 | 00. 99. c0. 36. 11. 00 | 2 | | ~270-12 |
| ⋮ | ⋮ | ⋮ | ⋮ | ⋮ | ⋮ | ⋮ | ⋮ | |

FIG. 8B

| USER MAC ADDRESS | VLAN ID | LAYER 2 TUNNELING TYPE | S-VLAN ID | CGW MAC ADDRESS | EGW MAC ADDRESS | L2-VPN SIDE PORT NO. | ISP SIDE PORT NO. | |
|---|---|---|---|---|---|---|---|---|
| 00. 99. c0. 30. 58. 00 | 6 | EXPANDED VLAN | 8 | — | — | 4 | 10 | ~270-11 |
| 00. 99. c0. 61. 72. 00 | — | Ethernet Over Ethernet | — | 00. 99. c0. 44. 21. 00 | 00. 99. c0. 36. 11. 00 | 2 | 5 | ~270-12 |
| ⋮ | ⋮ | ⋮ | ⋮ | ⋮ | ⋮ | ⋮ | ⋮ | |

FIG. 9A

USER MANAGEMENT TABLE 27-2

| USER MAC ADDRESS | VLAN ID | LAYER 2 TUNNELING TYPE | S-VLAN ID | CGW MAC ADDRESS | EGW MAC ADDRESS | L2-VPN SIDE PORT NO. | ISP SIDE PORT NO. | |
|---|---|---|---|---|---|---|---|---|
| 00.99.c0. 29.80.00 | — | Ethernet Over Ethernet | — | 00.99.c0. 81.63.00 | 00.99.c0. 12.64.00 | 6 | 12 | ~270-21 |
| 00.99.c0. 55.34.00 | 1 | EXPANDED VLAN | 2 | — | — | 3 | | ~270-22 |
| ⋮ | ⋮ | ⋮ | ⋮ | ⋮ | ⋮ | ⋮ | ⋮ | |

Columns labeled: 271, 272, 273, 274, 275, 276, 277, 278

FIG. 9B

| USER MAC ADDRESS | VLAN ID | LAYER 2 TUNNELING TYPE | S-VLAN ID | CGW MAC ADDRESS | EGW MAC ADDRESS | L2-VPN SIDE PORT NO. | ISP SIDE PORT NO. | |
|---|---|---|---|---|---|---|---|---|
| 00.99.c0. 29.80.00 | — | Ethernet Over Ethernet | — | 00.99.c0. 81.63.00 | 00.99.c0. 12.64.00 | 6 | 12 | ~270-21 |
| 00.99.c0. 55.34.00 | 1 | EXPANDED VLAN | 2 | — | — | 3 | 8 | ~270-22 |
| ⋮ | ⋮ | ⋮ | ⋮ | ⋮ | ⋮ | ⋮ | ⋮ | |

Columns labeled: 271, 272, 273, 274, 275, 276, 277, 278

FIG. 10

PORT MANAGEMENT TABLE 28-1

| DOMAIN | ISP SIDE PORT NO. | SERVICE NAME COMPILE FLAG | |
|---|---|---|---|
| ISP1 | 5 | 1 | 280-11 |
| ISP4 | 8 | 1 | 280-12 |
| ISP5 | 10 | 0 | 280-13 |
| ⋮ | ⋮ | ⋮ | |

FIG. 11

PORT MANAGEMENT TABLE 28-2

| DOMAIN | ISP SIDE PORT NO. | SERVICE NAME COMPILE FLAG | |
|---|---|---|---|
| ISP2 | 12 | 1 | 280-21 |
| ISP4 | 8 | 1 | 280-22 |
| ISP5 | 4 | 0 | 280-23 |
| ⋮ | ⋮ | ⋮ | |

FIG. 12

USER MANAGEMENT TABLE 37

| DOMAIN | PASSWORD | LAYER 2 TUNNELING TYPE | S-VLAN ID | EGW MAC ADDRESS | CGW MAC ADDRESS | |
|---|---|---|---|---|---|---|
| ISP1 | Pass1 | Ethernet Over Ethernet | — | 00. 99. c0. 36. 11. 00 | 00. 99. c0. 44. 21. 00 | ~370-1 |
| ISP4 | Pass4 | EXPANDED VLAN | 2 | — | — | ~370-2 |
| ISP5 | Pass5 | Ethernet Over Ethernet | — | 00. 99. c0. 12. 64. 00 | 00. 99. c0. 33. 84. 00 | ~370-3 |
| ⋮ | ⋮ | ⋮ | ⋮ | ⋮ | ⋮ | |

PACKET FORWARDING CONTROL METHOD AND PACKET FORWARDING APPARATUS

CLAIM OF PRIORITY

The present application claims priority from Japanese patent application serial No. 2006-204406, filed on Jul. 27, 2006, the content of which is hereby incorporated by reference into this application.

BACKGROUND OF THE INVENTION (1) Field of the Invention

The present invention relates to a packet forwarding control method and a packet forwarding apparatus and, more particularly, to a packet forwarding control method and a packet forwarding apparatus for a layer 2 virtual private network (L2-VPN) over which packets for a user authentication protocol, such as PPPoE packets, are forwarded by layer 2 tunneling.

(2) Description of the Related Art

As an authentication-based high-speed Internet connection service (high-speed remote access service) using a high-speed access line such as ADSL (Asymmetric Digital Subscriber Line), FTTH (Fiber to the Home), or wireless LAN (Local Area Network) has become prevalent, a communication environment for efficiently forwarding large-capacity information, such as contents data, to user terminals has been established.

In a high-speed remote access service, PPPoE (Point to Point Protocol over Ethernet) and PPP for connection protocols between terminals are terminated with a high-speed access terminating apparatus, such as BAS (Broadband Access Server), which is a gateway apparatus managed by a communication service agent. Upon receiving a connection request for requesting a connection with the Internet from a user terminal, the BAS requests user authentication from an authentication server, for example, a Radius (Remote Authentication Dial-In User Service) server managed by an Internet Service Provider (ISP) or another connection service company. The BAS starts a packet forwarding service at a layer 3 level between the user terminal having succeeded in user authentication and an ISP network.

Conventionally, an ISP or a connection service company which does not have a dedicated high-speed access line has rented a layer 3 IP (internet Protocol) transit network including high-speed access lines and a BAS from a communication service agent. The ISP is allowed to provide an authentication-based high-speed Internet connection service conscious only of user authentication and the layer 3 without being conscious of the PPPoE and PPP, by operating the rented transit network as an IP-VPN (Virtual Private Network).

However, in the high-speed remote access service using the IP-VPN, there is the possibility that ISP cannot provide a connection service desired by a user under constraints placed by a layer 3 communication protocol in the transit network. For example, even though the user desires to use an IPv6 protocol or a specific protocol used in a general-purpose computer, the service cannot respond to a request from the user if the transit network is compatible only with an IPv4 protocol.

In recent years, communication service agents have provided L2-VPN services, in which high-speed access lines such as ADSL, FTTH, or wireless LAN and a wide area Ethernet network are used, in place of the IP-VPN service requiring the existence of an IP network. In a L2-VPN, the range between site A and site B can be treated as if it belongs to the same broadcast domain, by using layer 2 tunneling such as, e.g., Ethernet over Ethernet defined in the IEEE 802.1 ah or expanded VLAN defined in the IEEE 802.1ad.

When a transit network is comprised of a wide area Ethernet network, even an ISP or communication service company having no dedicated lines is allowed to provide a connection service equivalent to the service conventionally provided through a dial-up connection in an ISDN or the like to a user terminal connected with a high-speed access line, by connecting a BAS to the transit network and forming a L2-VPN on the transit network. That is, by supplying a wide area Ethernet network as a L2-VPN from a communication service agent to each ISP (or communication service company) having a BAS, the ISP can provide a highly flexible communication service to users without incurring constraints placed by the L3 communication protocol on the transit network.

Conventionally, when a communication service agent supplies an IP-VPN to a plurality of ISPs, these ISPs have been requested to share communication equipment such as a high-speed access lines and BAS. In this case, the BAS is used to manage user information in association with an ISP to which each user is subscribed so that an authentication request received from each of the users is dynamically distributed to the ISP corresponding to the user, in a PPP protocol authentication phase.

In order to forward packets by layer 2 tunneling between site A and site B when a L2-VPN is provided in place of the IP-VPN to the ISP, it is necessary to set packet forwarding control parameters as tunneling control information depending on the tunneling type such as, e.g., Ethernet over Ethernet or expanded VLAN, to respective packet forwarding apparatuses serving as the sites A and B. However, when layer 2 tunneling control information is statically set in advance to the respective packet forwarding apparatuses serving as the sites A and B, a packet forwarding route is fixedly determined and it becomes difficult to perform dynamic distribution of received packets to the respective ISPs corresponding to the users, as has been performed by the shared BAS in the IP-VPN.

SUMMARY OF THE INVENTION

An object of the present invention is to provide a packet forwarding control method and a packet forwarding apparatus capable of dynamic setting of control information required for layer 2 tunneling to a wide area Ethernet network at the time when a connection request for connecting with an IP network is issued from a user terminal so that user packets transmitted from the user terminal can be forwarded to the ISP to which the user belongs.

To attain the object, a packet forwarding control method according to the present invention is applied to a wide area Ethernet network having an edge side packet forwarding apparatus (EGW) coupled with a plurality of access lines for communicating with user terminals; a plurality of core side packet forwarding apparatuses (CGWs); and an authentication server storing layer 2 tunneling control information in association with the ISP domain names, wherein each of the core side packet forwarding apparatuses is connected to at least one gateway apparatus (GW) which is associated with the core side packet forwarding apparatus and controls a connection between each of the user terminals belonging to an ISP and a layer 3 network. The packet forward control method is comprised the steps of:

transmitting from the edge side packet forwarding apparatus to the authentication server when a connection request packet for requesting a connection with the layer 3 network was received from one of the user terminals, a user authentication request message including an ISP domain name and user authentication information each extracted from the connection request packet;

replying from the authentication server having received the user authentication request message to the edge side packet forwarding apparatus a response message including layer 2 tunneling control information corresponding to the ISP domain name specified by the user authentication request message when user authentication succeeded;

causing the edge side packet forwarding apparatus having received the response message to register in a first user management table a new table entry indicating the correspondence between a source address of the connection request packet and the layer 2 tunneling control information extracted from the response message, encapsulate the connection request packet in accordance with the layer 2 tunneling control information, and transmit the encapsulated packet as a layer 2 tunneling packet to the wide area Ethernet network; and causing one of the core side packet forwarding apparatuses having received the layer 2 tunneling packet to register in a second user management table a new table entry indicating the correspondence between the layer 2 tunneling control information and a source address of the connection request packet each extracted from the layer 2 tunneling packet and forward the connection request packet obtained by decapsulating the layer 2 tunneling packet to the gateway apparatus associated with the core side packet forwarding apparatus.

More specifically, the packet forwarding control method according to the present invention further comprises the steps of:

retrieving by the core side packet forwarding apparatus, when a packet destined to the user terminal was received from the gateway apparatus, a table entry matched with a destination address of the received packet from the second user management table to encapsulate the received packet in accordance with the layer 2 tunneling control information indicated in the table entry, and transmitting the encapsulated packet as a layer 2 tunneling packet to the wide area Ethernet network; and decapsulating by the edge side packet forwarding apparatus the layer 2 tunneling packet received from the core side packet forwarding apparatus and forwarding the decapsulated packet to the user terminal corresponding to the destination address of the packet.

When the table entry matched with the destination address of the received packet is not found in the second user management table, the core side packet forwarding apparatus discards the packet received from the gateway apparatus.

In the packet forwarding control method according to the present invention, the edge side packet forwarding apparatus retrieves, when a packet other than the connection request packet for requesting a connection to the layer 3 network was received from the user terminal, a table entry matched with a source address of the received packet from the first user management table, encapsulates the received packet in accordance with the layer 2 tunneling control information indicated in the table entry, and transmits the encapsulated packet as a layer 2 tunneling packet to the wide area Ethernet network. In this case, one of the core side packet forwarding apparatuses having received the layer 2 tunneling packet decapsulates the received packet and forwards the decapsulated packet to the gateway apparatus associated with the core side packet forwarding apparatus. When the table entry matched with the source address of the received packet is not found in the first user management table, the edge side packet forwarding apparatus discards the packet received from the user terminal.

In an embodiment of the present invention, each of table entries in the first and second user management tables stores, as the layer 2 tunneling control information, a tunneling type and capsulation header information corresponding to the tunneling type. In this case, the edge side packet forwarding apparatus encapsulates packets received from each of the access lines by using the capsulation header information determined in accordance with the tunneling type indicated in the table entry retrieved from the first user management table, and the core side packet forwarding apparatus encapsulates packets received from the gateway apparatus by using capsulation header information determined in accordance with the tunneling type indicated in the table entry retrieved from the second user management table. Each of the table entries in the first and second user management tables is deleted when a communication termination request packet is issued.

In an embodiment of the present invention, at least one of the core side packet forwarding apparatuses is connected to a plurality of gateway apparatuses each identified by a service name and forwards, when a layer 2 tunneling packet having a packet header including the ISP domain name and the service name was received from the wide area Ethernet network, a packet obtained by decapsulating the layer 2 tunneling packet to the gateway apparatus specified by the service name.

A packet forwarding apparatus according to an aspect of the present invention is coupled to a plurality of access lines for communicating with user terminals and connected to a wide area Ethernet network including a plurality of core side packet forwarding apparatuses and an authentication server storing layer 2 tunneling control information in association with the ISP domain names. The packet forwarding apparatus comprises:

means for transmitting to the user authentication server when a connection request packet for requesting a connection with a layer 3 network was received from one of the user terminals through any of the access lines, a user authentication request message including an ISP domain name and user authentication information each extracted from the connection requests packet, and receiving from the authentication server a response message including layer 2 tunneling control information corresponding to the ISP domain name specified by the user authentication request message;

means for storing a new table entry indicating the correspondence between a source address of the connection request packet and the layer 2 tunneling control information extracted from the response message in a user management table;

means for encapsulating the connection request packet in accordance with the layer 2 tunneling control information and transmitting the connection request packet as a layer 2 tunneling packet to the wide area Ethernet network;

means for retrieving, when a packet other than the connection request packet for requesting a connection with the layer 3 network was received from the user terminal, a table entry matched with a source address of the received packet from the user management table, encapsulating the received packet in accordance with the layer 2 tunneling control information indicated in the table entry, and transmitting the packet as a layer 2 tunneling packet to the wide area Ethernet network; and means for decapsulating, when a layer 2 tunneling packet was received from the wide area Ethernet network, the layer 2 tunneling packet and forwarding a decapsulated packet to one of the user terminals corresponding to a destination address of the packet.

A packet forward apparatus according to the present invention is connected to at least one gateway apparatus and a wide area Ethernet network so as to forward a layer 2 tunneling packet received from the wide area Ethernet network to the gateway apparatus in a decapsulated packet format and forward a packet received from the gateway apparatus to the wide area Ethernet network after converting the received packet into a layer 2 tunneling packet. The packet forwarding apparatus comprises:

means for registering in a user management table, when a layer 2 tunneling packet transmitted from a user terminal and including a connection request packet for requesting a connection with a layer 3 network was received from the wide area Ethernet network, a new table entry indicating the correspondence between a layer 2 tunneling control information and a source address of the connection request packet, each extracted from the received packet; and means for retrieving, when a packet was received from the gateway apparatus, a table entry matched with a destination address of the received packet from the user management table, encapsulating the received packet in accordance with the layer 2 tunneling control information indicated in the table entry, and transmitting the encapsulated packet as a layer 2 tunneling packet to the wide area Ethernet network.

In accordance with the present invention, it becomes possible in a high-speed remote access service using a L2-VPN to forward packets transmitted from a user terminal to the ISP to which the user belongs, by dynamically setting control information required for layer 2 tunneling at the time when a connection request for requesting a connection with an IP network is issued from the user terminal.

BRIEF DESCRIPTION OF THE DRAWINGS

These and other features, objects and advantages of the present invention will become more apparent from the following description when taken in conjunction with the accompanying drawings wherein:

FIGS. 5A to 5F are views each showing a structure of a user management table provided in the EGW 10-1 and changes in the contents of the user management table;

FIG. 6 is a view showing a structure of a port management table provided in the EGW 10-1;

FIGS. 8A and 8B are views each for illustrating a structure of a user management table 27-1 provided in the CGW 20-1 and changes in the contents of the user management table 27-1;

FIGS. 9A and 9B are views each for illustrating the structure of the user management table 27-1 provided in the CGW 20-1 and changes in the contents of the user management table 27-1;

FIG. 10 is a view showing a structure of a port management table 28-1 provided in the CGW 20-1;

FIG. 11 is a view showing a structure of a port management table 28-2 provided in the CGW 20-2;

FIG. 12 is a view showing a structure of a user management table 37 provided in a Radius server 31;

DETAILED DESCRIPTION OF THE PREFERRED EMBODIMENTS

Figure 1:
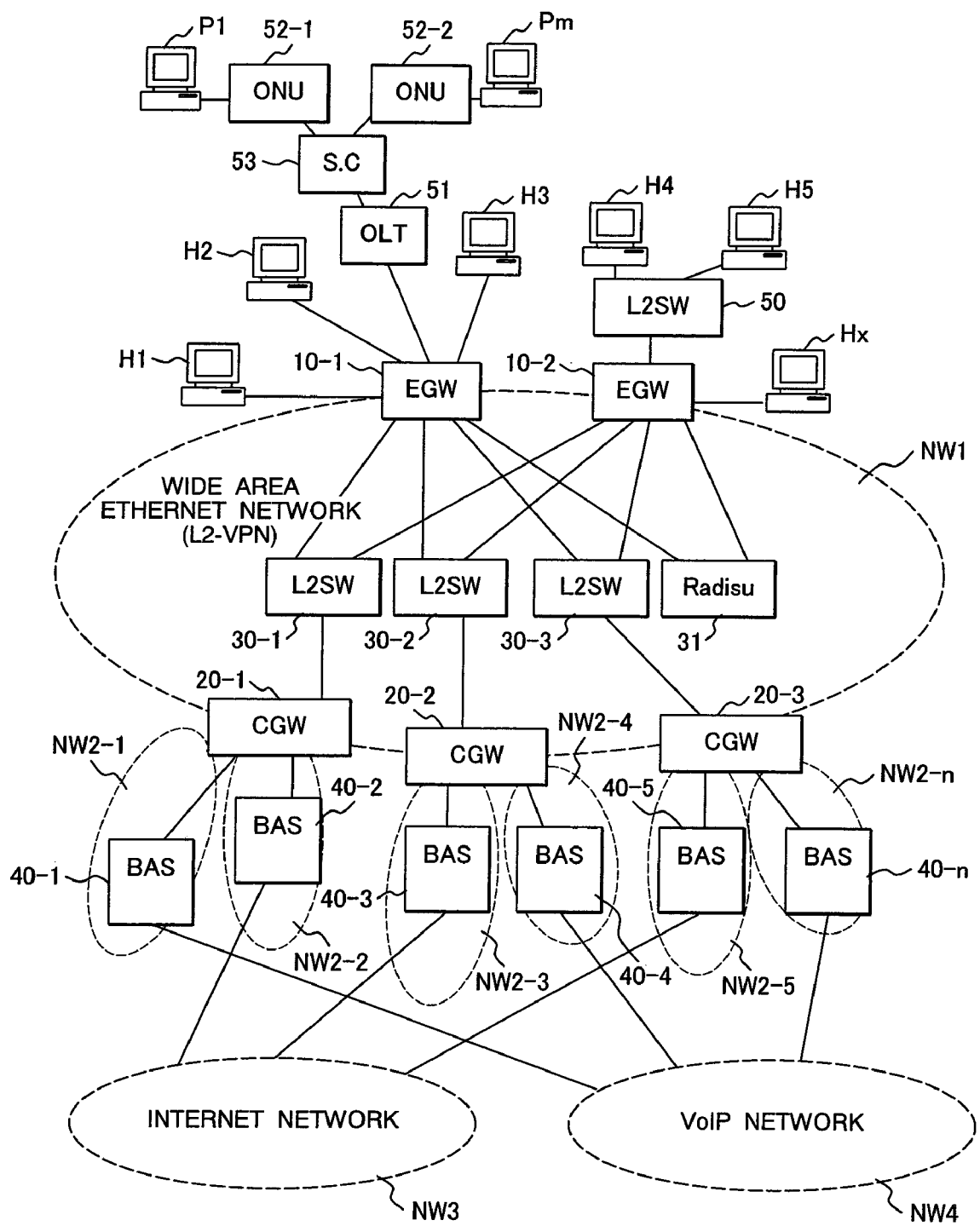
FIG. 1 is a view showing an example of a structure of a communication network to which the present invention is applied.

By referring to the drawings, the embodiments of the present invention will be described herein below in detail.

FIG. 1 shows an example of a structure of a communication network according to the present invention capable of providing a wide area Ethernet network as a L2-VPN.

NW1 denotes a wide area Ethernet network (L2-VPN network) for selectively connecting a plurality of user terminals H (H1 to Hx) and P (P1 to Pm) to one of a plurality of ISP networks NW2 (NW2-1 to NW2-n).

The wide area Ethernet network NW1 is comprised of a plurality of edge side packet forwarding apparatuses (layer 2 gateways: L2GWs) 10 (10-1 and 10-2) each coupled to a plurality of access lines at the user terminal side, a plurality of core side packet forwarding apparatus (layer 2 gateways: L2GWs) 20 (20-1 to 20-3) connected to the respective broadband access servers (hereinafter referred to as BASs) 40 (40-1 to 40-n) of ISP networks NW2 (NW2-1 to NW2-n), a Radius server 31 as a user authentication server, and a plurality of layer 2 switches (hereinafter referred to as L2SWs) 30 (30-1 to 30-3) for connecting the L2GWs 10 (10-1 and 10-2) to the L2GWs 20 (20-1 to 20-3).

In the description given herein below, each of the L2GWs 10 at the user terminal side will be termed "EGW (Edge Gateway)" and each of the L2GWs 20 at the ISP network side will be termed "CGW (Core Gateway)". The present invention implements a plurality of ISP-compatible L2-VPNs on the wide area Ethernet network NW1 by performing layer 2 tunneling by Ethernet over Ethernet, expanded VLAN, and the like between the EGWs 10 and the CGWs 20.

Each of the EGWs 10 encapsulates a PPPoE packet received from each of the user terminals (H1 to Hx and P1 to Pn) via an access line with an Ethernet header and forwards the encapsulated packet in a layer 2 tunneling packet format to the corresponding L2SW 30, while decapsulating a layer 2 tunneling packet received from the L2SW 30 and forwarding the packet thus decapsulated in a PPPoE packet format to the access line to which the destination user terminal is connected.

On the other hand, each of the CGWs 20 decapsulates a layer 2 tunneling packet received from the corresponding L2SW 30 and forwards the decapsulated packet in the PPPoE packet format to the corresponding LSP network NW2, while encapsulating a PPPoE packet received from the ISP network NW2 with the Ethernet header and forwarding the encapsulated packet in the layer 2 tunneling packet format to the L2SW 30.

In the example shown in FIG. 1, each of the BASs 40 (40-1 to 40-n) belonging to the respective ISP networks is connected to an Internet network NW3 which provides various information communication services or to a VoIP network NW4 which provides an audio communication service using an IP phone.

To the connection between the user terminals and the EGWs 10, various access line formats can be adopted. In the example shown in the drawing, the user terminals H1 to H3 are connected to the EGW 10-1 via individual access lines and the user terminals P1 to Pm are connected to the EGW 10-1 via a PON (Passive Optical Network).

The PON comprises a station side apparatus OLT (Optical Line Terminal) 51 and a plurality of subscriber connection apparatuses ONUs (Optical Network Units) 52 (52-1 to 52-m) and has a structure in which an optical fiber connected to the OLT is divided into a plurality of branch optical fibers by an optical coupler (S. C: Star Coupler) 53 and the ONUs are connected to the respective branch optical fibers. To the EGW 10-2, the user terminal Hx is connected via an individual access line and the user terminals H4 and H5 are connected via a L2SW 50.

Each of the EGWs 10 manages layer 2 tunneling control information for each user terminal coupled thereto by using a user management table as described later and performs user authentication using the Radius server 31.

Figure 2A:
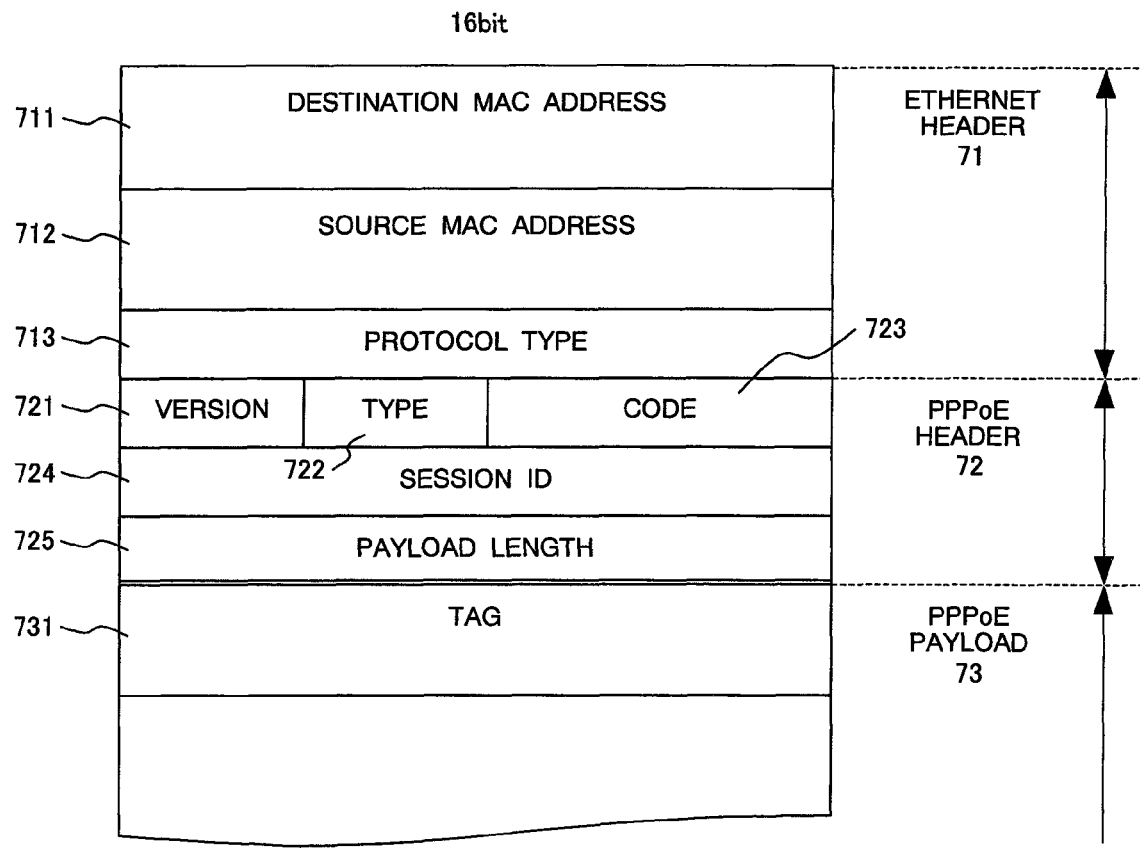
FIG. 2A shows the format of a PPPoE packet and FIG. 2B shows a TAG 731 in detail.

FIG. 2A shows the format of each of PPPoE packets to be communicated between the EGWs 10 and the user terminals and between the CGWs 20 and the BASs 40 in the network of FIG. 1.

The PPPoE packet includes an Ethernet header 71, a PPPoE header 72, and a variable-length PPPoE payload 73 forming the main body of a PPP packet. The Ethernet header 71 includes a source MAC address 711, a destination MAC address 722, the protocol type 713 of the subsequent header, and other header information items.

The PPPoE header 72 includes a version 721, a type 722, a code 723, a session ID 724, and a payload length 725. To the code 723, identification information indicating a packet type such as a PADI (The PPPoE Active Discovery Initiation) packet transmitted as a connection request packet (PPPoE phase initiation packet) from any of the user terminals, a PADO (The PPPoE Active Discovery Offer) packet as a response packet to the PADI, a PADR (The PPPoE Active Discovery Request) packet as a packet for requesting the initiation of a PPP session, a PADS (The PPPoE Active Discovery Session-Confirmation) packet as a response packet to the PADR, or a PADT (PPPoE Active Discovery Terminate) packet as a packet for requesting the termination of PPP communication is set.

Figure 2B:
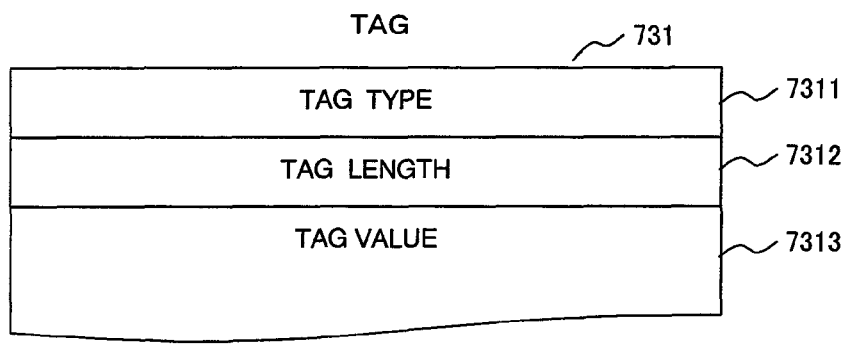

The PPPoE payload 732 includes a TAG 731. As shown in FIG. 2B, the TAG 731 includes a TAG type 7311, a TAG length 7312, and a TAG VALUE 7313. The TAG type 7311 indicates the type of the TAG VALUE 7313. In a case where a user specifies a desired communication service with the service name, a value "0x0101" is set to the TAG type 7311. The length of the service name is specified with the TAG length 7313, and the service name is described in the TAG VALUE 7313.

For example, when the user desires an IP phone service using the VoIP network NW4, the value "0x0101", the identification name of the VoIP service, and the length of the service name are set to the TAG type 7311, the TAG VALUE 7313, and the TAG length 7312, respectively. If the TAG VALUE 7313 has no description therein, the TAG length 7312 is regarded as "0".

As will be described later; it is possible to describe the domain name of an ISP and a password together with the service name in the TAG VALUE 7313. It is also possible to describe only the domain name of the ISP and the password by omitting the service name. If the service name is not specified, a normal connection service to the Internet network NW3 is executed at the side of the corresponding CGW 20.

Figure 3:
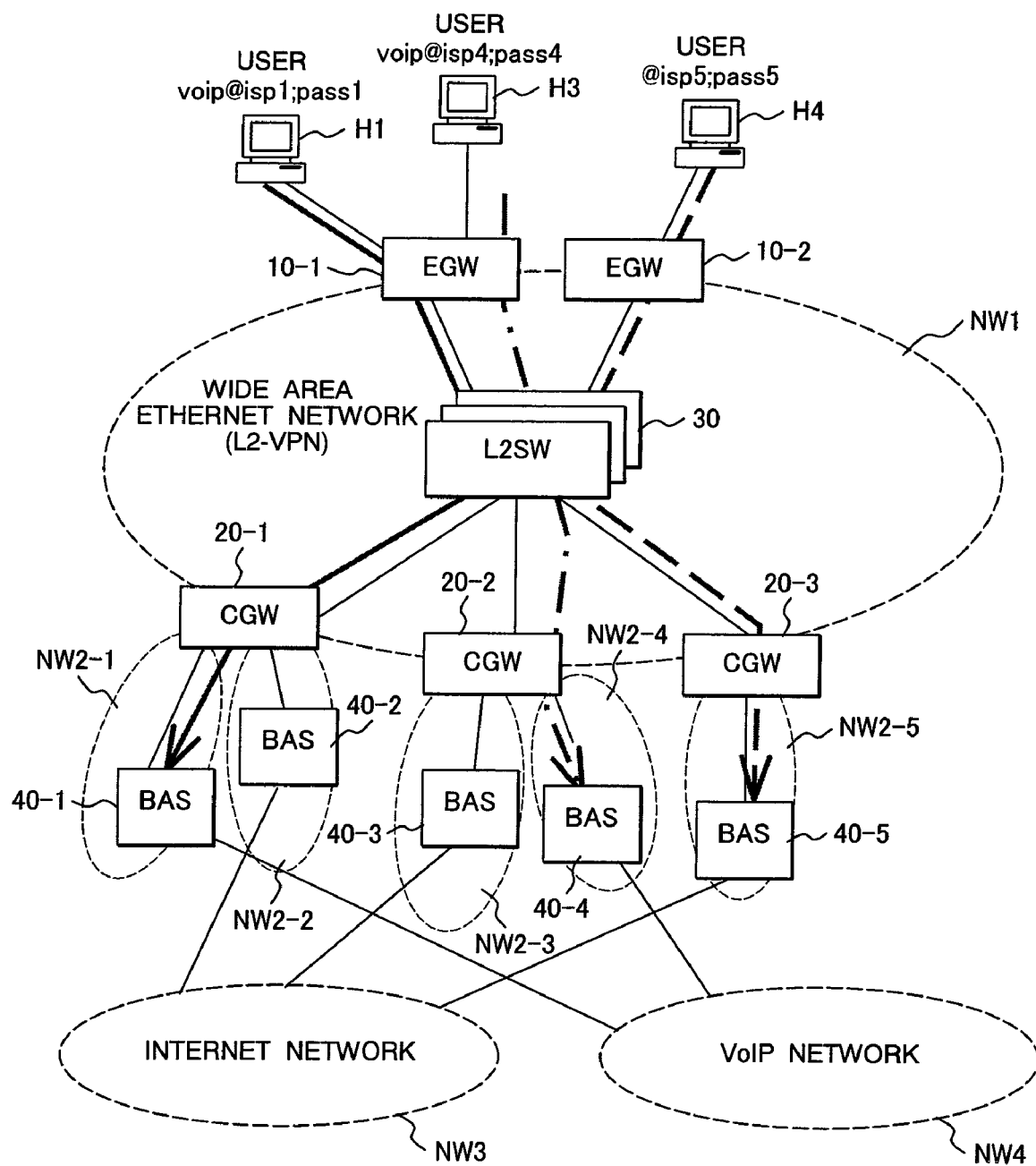
FIG. 3 is a view for illustrating the operation of selecting a BAS to which a user terminal is to be connected in the communication network of FIG. 1.

FIG. 3 is a view illustrating the operation of selecting a BAS to be connected with one of the user terminals in the wide area Ethernet network shown in FIG. 1.

According to the present invention, in order to dynamically distribute a PPPoE packet received from any of the user terminals (H1 to Hx and P1 to Pm) to one of the plurality of BASs 40-1 to 40-n located in the ISP networks NW2 (NW2-1 to NW2-n) in the connection service using the wide area Ethernet network (L2-VPN network) NW1, the domain name indicating the ISP to be connected with the user terminal and the password information are described in the TAG VALUE 7313 of the PPPoE packet shown in FIG. 2 in addition to the service name (service identifier).

Upon receiving a PADI packet requesting a connection to an IP network from the user terminal, each of the EGWs 10 (10-1 and 10-2) and the CGWs 20 (20-1 to 20-3) serving as a PPPoE packet forwarding apparatus distributes the PADI packet to an ISP network specified by the domain name shown by the TAG VALUE 7313.

For example, it is assumed here that the user terminal H1 transmits a PADI packet including "voip@isp1;pass1" as the TAG VALUE 7313. In the TAG VALUE 7131, "voip" indicates the service name, "@isp" indicates the domain name, and "pass1" indicates the password information. In this case, the PADI packet is forwarded to the CGW 20-1 via the EGW 10-1 and the L2SW 30 in accordance with the domain name, as indicated by the bold solid line in FIG. 3. Upon receiving the PADI packet, the CGW 20-1 distributes the PADI packet to the BAS 40-1 placed in the ISP network NW2-1 having the domain name "voip" for connecting to the VoIP network (NW4).

Likewise, a PADI packet transmitted from the user H3 and including "voip@isp4;pass4" in the TAG VALUE 7313 is forwarded to the CGW 20-2 via the EGW 10-1 and the L2SW 30 and forwarded to the BAS 40-4 placed in the ISP network NW2-4 having the domain name "isp4" for connecting to the VoIP network, as indicated by the bold dash-dot line.

A PADI packet transmitted from the user terminal H4 includes "@isp5;pass5" in the TAG VALUE 7131. As the service name is omitted from the TAG VALUE 7131, this PADI packet is forwarded to the CGW 20-3 via the EGW 10-2 and the L2SW 30, as indicated by the bold dashed line, and distributed to the BAS 40-5 for connecting to the Internet network (NW3) placed in the ISP network NW2-5 having the domain name "isp5".

Figure 4:
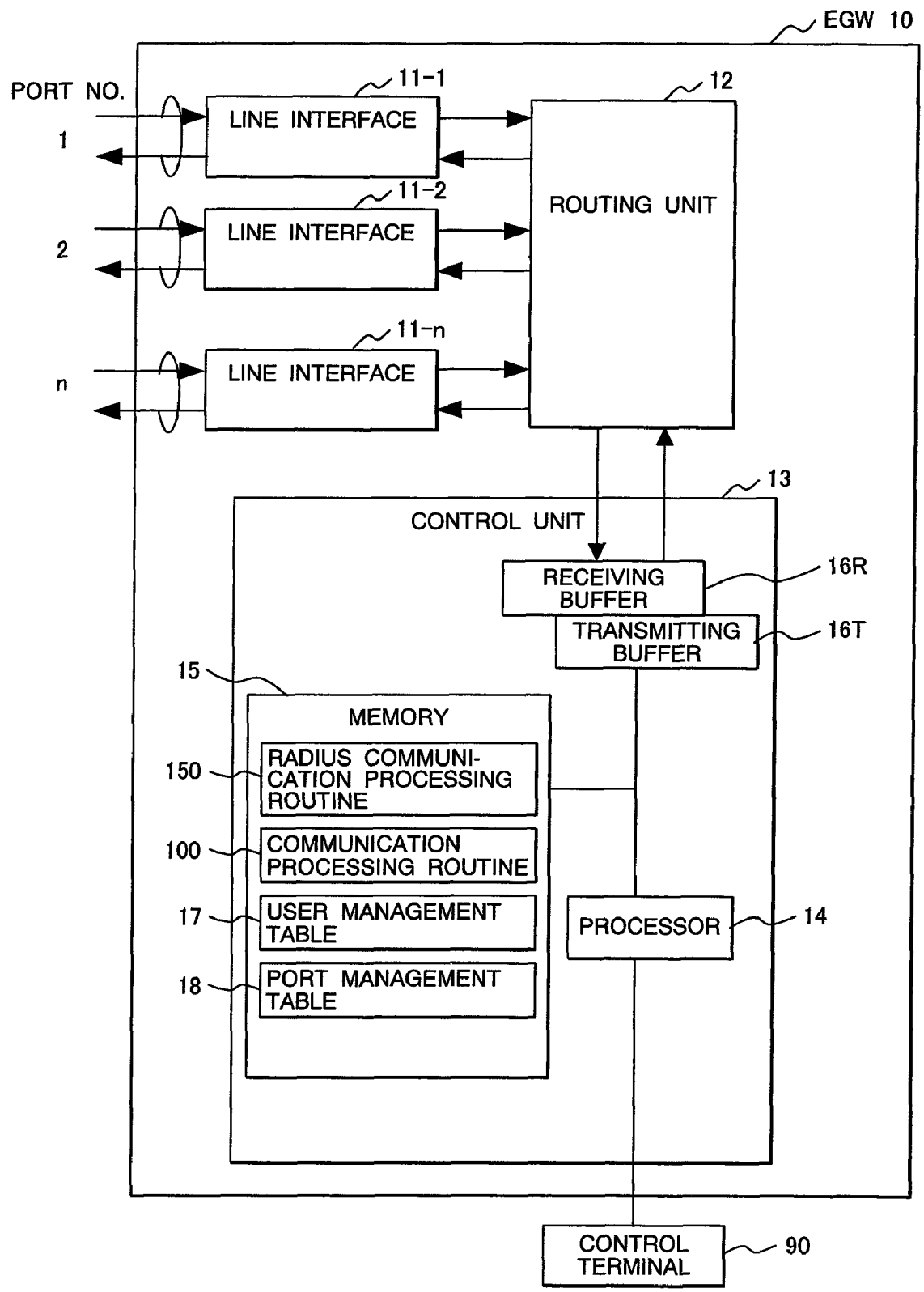
FIG. 4 is a structural view showing an embodiment of each of the EGWs 10 (10-1 and 10-2) shown in FIG. 1.

FIG. 4 is a block structural diagram showing an embodiment of each of the EGWs 10 (10-1 and 10-2).

The EGW 10 comprises a plurality of input and output (I/O) line interfaces 11 (11-1 to 11-n) having respective port numbers, a routing unit 12 connected to each of the I/O line interfaces 11, and a control unit 13 connected to the routing unit 12. A reference numeral 90 denotes a control terminal connected to the control unit 13.

The control unit 13 executes protocol processing in cooperation with the routing unit 12. The control unit 13 comprises a processor 14, a memory 15, a transmitting buffer 16T, and a receiving buffer 16R. In the memory 15, a communication processing program 100 for performing the Internet connection/disconnection of each user terminal, encapsulation of PPPoE packets and decapsulation of layer 2 tunneling packets, and a Radius communication processing routine 150 for communicating with the Radius server 31 are stored as programs to be executed by the processor 14. In the memory 15, a user management table 17 and a port management table 18, each described in detail later, are formed.

Upon receiving a packet from any of the line interfaces 11-1 to 11-n, the routing unit 12 determines whether the received packet is a communication control packet or a user packet by checking the packet type identification information of the PPPoE header. When the received packet is a communication control packet such as the PADI described above, the routing unit 12 forwards the received packet to the receiving buffer 16R. The routing unit 12 forwards user packets received from the line interfaces 11-1 to 11-n and communication control packets outputted from the processor 14 to the transmitting buffer 16T to any of the line interfaces 11-1 to 11-n in accordance with the destination MAC address 711 or the TAG 731 of the packets.

FIGS. 5A to 5F show a structure of the user management table 17 provided in the control unit 13 of the EGW 10-1 and time-serial changes in the contents of the user management table 17. The other EGW also has the user management table 17 having the same structure as the user management table 17 of the EGW 10-1.

The user management table 17 includes a plurality of table entries 170 (170-1, 170-2, . . . ) each corresponding to the MAC address of the user terminal. Hereinafter, this MAC address will be referred to as user MAC address.

Each of the table entries 170 is comprised of a plurality of fields indicating a user MAC address 171, a VLAN identifier (VLAN ID) 172 defined between the user terminal and the corresponding BAS 40, a layer 2 tunneling type 173 indicating the type of layer 2 tunneling formed between the EGW 10-1 and one of the CGWs 20 (20-1 to 20-3), e.g., Ethernet over Ethernet, expanded VLAN, or the like, an S-VLAN ID 174 indicating the VLAN identifier between the EGW 10-1 and one of the CGWs 20 (20-1 to 20-3), the MAC address 175 of the EGW 10-1, the MAC address 176 of the CGW connected by layer 2 tunneling, the port number (user side port number) 177 of the line interface for connecting to the user terminal having the MAC address 171, and the port number (L2-VPN side port number) 178 of the line interface at the side of the wide area Ethernet network which relays the VLAN.

Upon receiving a PADI packet from any of the user terminals, the processor 14 adds a new table entry indicating the user MAC address 171, the VLAN ID 172, and the user side port number 177 to the user management table 17, as shown by, e.g., the entry 170-2 of FIG. 5A. When the VLAN ID was not set to the received PADI packet, a code "-" indicating no definition of an ID is set to the VLAN ID 172.

To the fields of layer 2 tunneling type 173, S-VLAN ID 174, EGW MAC address 175 and CGW MAC address 176, values extracted from an access permission message "Access-Accept" are set when the Access-Accept message was received from the Radius server 31 having performed user authentication, as will be described later.

If the Access-Accept message does not indicate the VLAN identifier (S-VLAN ID), e.g., when the tunneling type is the Ethernet over Ethernet, the code "-" indicating no definition of an ID is set as the S-VLAN ID 174. If the Access-Accept message does not indicate either the MAC address of the EGW2 or the MAC address of the CGW, e.g., when the tunneling type is the expanded VLAN, the code "-" indicating no definition of an address is set to each field of the EGW MAC address 175 and the CGW MAC address 176.

As the L2-VPN side port number 178, the value of the port number registered for each domain name in the port management table 18 is set. The time-serial changes in the contents of the user management table 17 shown in FIGS. 5B to 5F will be described later.

Figure 6:
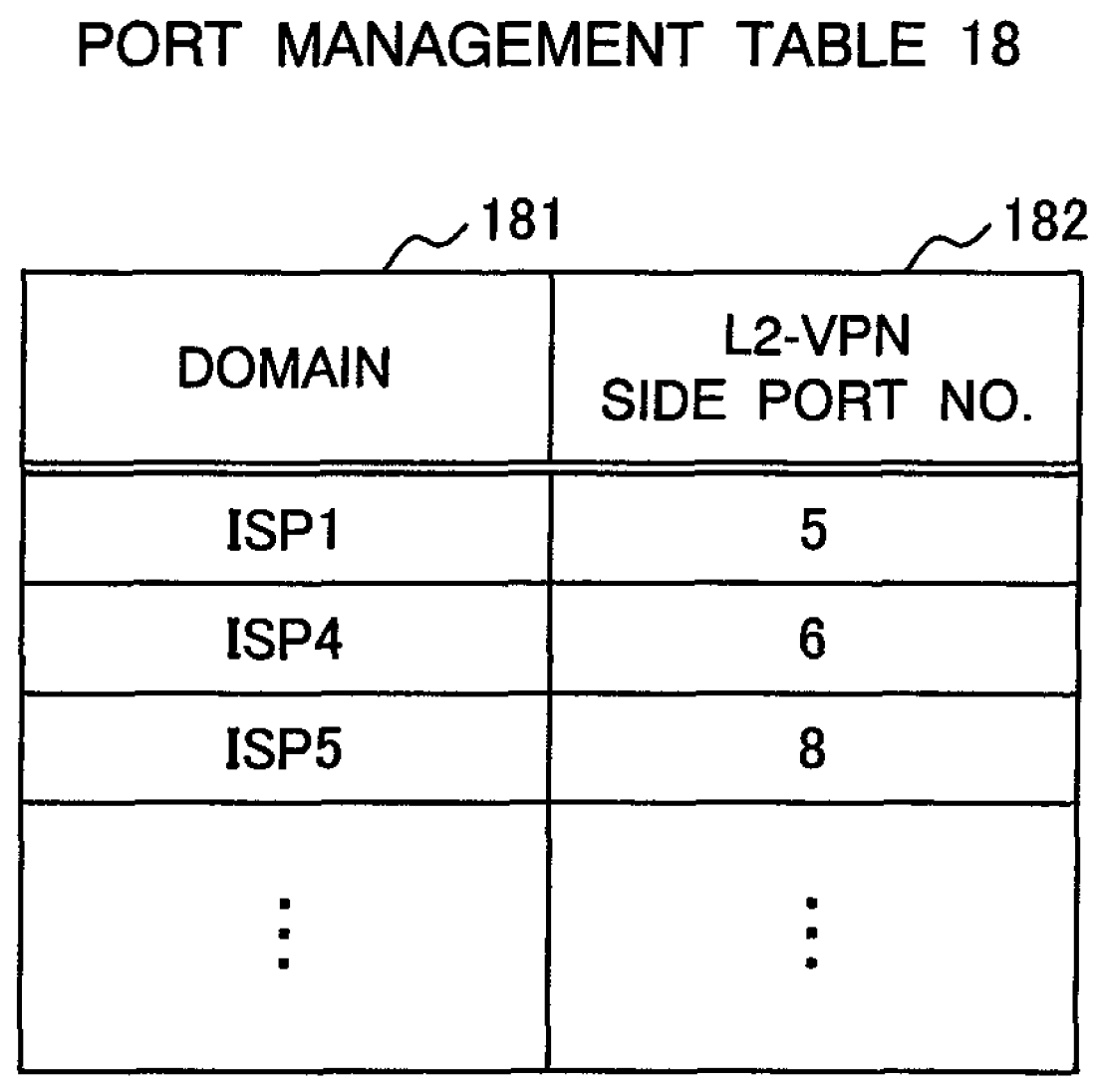

FIG. 6 shows a structure of the port management table 18 provided in the EGW 10-1. The port management table 18 includes a plurality of entries each indicating the port number of the line interfaces 11 at the L2-VPN side (L2-VPN side port number) in association with a domain name 181 of one of the ISP networks NW2-1 to NW2-n which are accessible from the EGW 10-1. Each entry of the port management table 18 is preliminarily registered by a network administrator.

Figure 7:
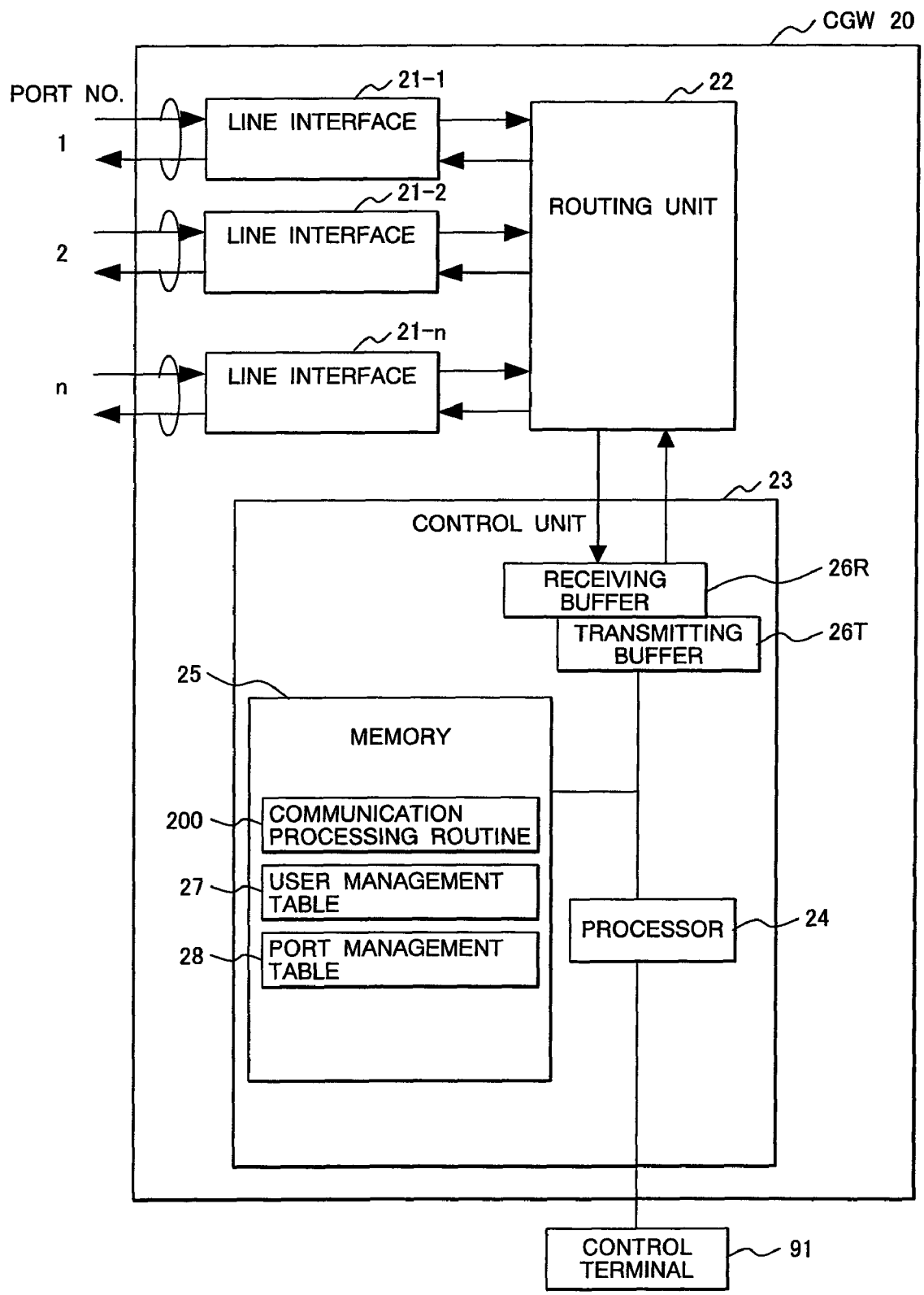
FIG. 7 is a structural view showing an embodiment of each of the CGWs 20 (20-1 to 20-3) shown in FIG. 1.

FIG. 7 shows a structure of each of the CGWs 20 (20-1 to 20-3).

The CGW 20 comprises a plurality of I/O line interfaces 21 (21-1 to 21-n) having respective port numbers, a routing unit 22 connected to each of the line interfaces 21, and a control unit 23 connected to the routing unit 22. A reference numeral 91 denotes a control terminal connected to the control unit 23. The control unit 23 executes protocol processing in cooperation with the routing unit 22. The control unit 23 comprises a processor 24, a memory 25, a transmitting buffer 26T, and a receiving buffer 26R.

In the memory 25, a communication processing program 200 for executing processes such as the Internet connection/disconnection of each user terminal, encapsulation/decapsulation of received packets for reciprocal conversion between PPPoE packets and layer 2 tunneling packets, and specification of the service name from the TAG VALUE of a PADI packet is stored as a program to be executed by the processor 24. In the memory 25, a user management table 27 and a port management table 28, which will be described in detail later, are formed.

Upon receiving a packet from any of the line interfaces 21-1 to 21-n, the routing unit 22 determines whether the received packet is a communication control packet by checking the packet type indicated in the PPPoE header. When the received packet is a communication control packet such as the PADI described above, the routing unit 22 forwards the received packet to the receiving buffer 26R. The routing unit 22 forwards user packets received from the line interfaces 21-1 to 21-n and communication control packets outputted from the processor 24 to the transmitting buffer 26T to any of the line interfaces 21-1 to 21-n in accordance with the destination MAC address 711 or the TAG 731 of the packets.

FIGS. 8A and 8B show a structure of the user management table 27-1 provided in the CGW 20-1 and FIGS. 9A and 9B show a structure of the user management table 27-2 provided in the CGW 20-2.

Each of the user management tables 27-1 and 27-2 is composed of a plurality of table entries 270 (270-1, 270-2, ...) corresponding to the MAC addresses of the user terminals.

Each of the table entries 270 comprises a plurality of fields for indicating the MAC address 271 of the corresponding user terminal (user MAC address), a VLAN identifier (VLAN ID) 272 defined between the user terminal and the corresponding BAS 40, a layer 2 tunneling type 273 indicating the type of layer 2 tunneling formed between the CGW 20 (20-1 or 20-2) and the corresponding EGW 10 (10-1 or 10-2), e.g., Ethernet over Ethernet, expanded LAN, or the like, a S-VLAN ID 274 indicating the VLAN identifier between the CGW 20 and the EGW 10, the MAC address 275 of the CGW 20, the MAC address 276 of the EGW 10 connected by layer 2 tunneling, a L2-VPN side port number 277, and an ISP side port number 278.

When a PADI packet with the layer 2 tunneling packet format is received from any of the user terminals, the CGW 20-1 (or 20-2) registers a new table entry including the user MAC address 271, the VLAN ID 272, the layer 2 tunneling type 273, the S-VLAN ID 274, the CGW MAC address 275, the EGW MAC address 276, and the L2-VPN side port number 277 in the user management table 27-1 (or 27-2).

If the VALN ID between the user terminal and the BAS and the VLAN ID (S-VLAN ID) between the EGW and the CGW are not set to the received layer 2 tunneling packet, i.e., when the tunneling type of the received packet is the Ethernet over Ethernet, the code "-" indicating no definition of an ID is set to each field of the VALN ID 272 and S-VLAN ID 274 of the table entry.

If the CGW MAC address and the EGW MAC address are not set to the received layer 2 tunneling packet, i.e., when the tunneling type of the received packet is the expanded VLAN, the code "-" indicating no definition of an address is set to each field of the CGW MAC address 275 and the EGW MAC address 276.

As the ISP side port number 278, a port number retrieved from the port management tables 28 (28-1 and 28-2) is set. About updating of the user management tables 27-1 and 27-2, detailed description will be made later.

FIG. 10 shows a structure of the port management table 28-1 provided in the CGW 20-1. FIG. 11 shows a structure of the port management table 28-2 provided in the CGW 20-2.

The port management table 28-1 (or 28-2) includes a plurality of table entries. Each of the entries indicates the correspondence among the domain name 281 of the ISP network connected to the CGW 20-1 (or 20-2), the ISP side port number 282 assigned to the line interface 21 (any of 21-1 to 21-$n$) at the ISP network side, and a service name compile flag 283.

The service name compile flag 283 indicates whether TAG conversion should be executed on a PADI packet received from the L2-VPN network. That is, the service name compile flag 283 designates whether the received packet is to be forwarded to the corresponding BAS after eliminating the domain name and the password from the TAG VALUE 7313 of the received packet to compile into a TAG VALUE which includes only the service name or the received packet is to be forwarded to the corresponding BAS without executing such compiling of the service name. In this embodiment, flag information "1" indicates that the service name should be compiled and flag information "0" indicates that the service name need not be compiled. These table entries are preliminarily registered by the network administrator to the port management tables 28-1 and 28-2.

FIG. 12 shows a structure of a user management table 37 provided in the Radius server 31. Each of table entries of the user management table 37 indicates the correspondence among an ISP domain 371, a password 372, the type 373 of layer 2 tunneling to be used between the EGW and the CGW, a S-VLAN ID 374 indicating the VLAN ID between the EGW and the CGW, the MAC address 375 of the EGW, and the MAC address 376 of the CGW.

First Embodiment

By referring to FIGS. 13 to 20, the operations of the EGW 10-1 and the CGW 20-1 will be described, as a first embodiment of the present invention, in a case where an L2-VPN is implemented by using Ethernet over Ethernet layer 2 tunneling between the EGW and the CGW.

Figure 13:
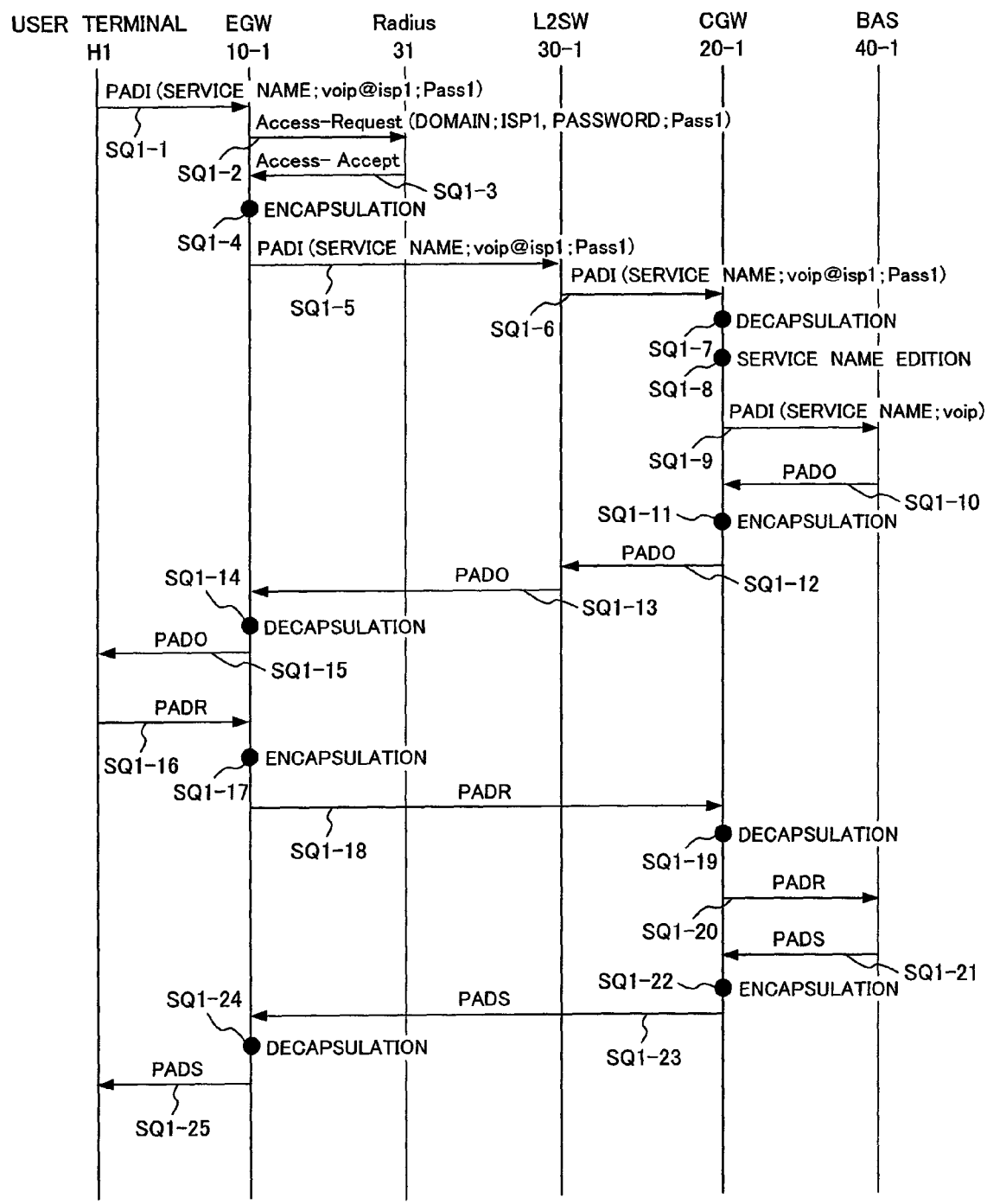
FIG. 13 is a communication sequence diagram showing a first embodiment of the present invention.
Figure 14:
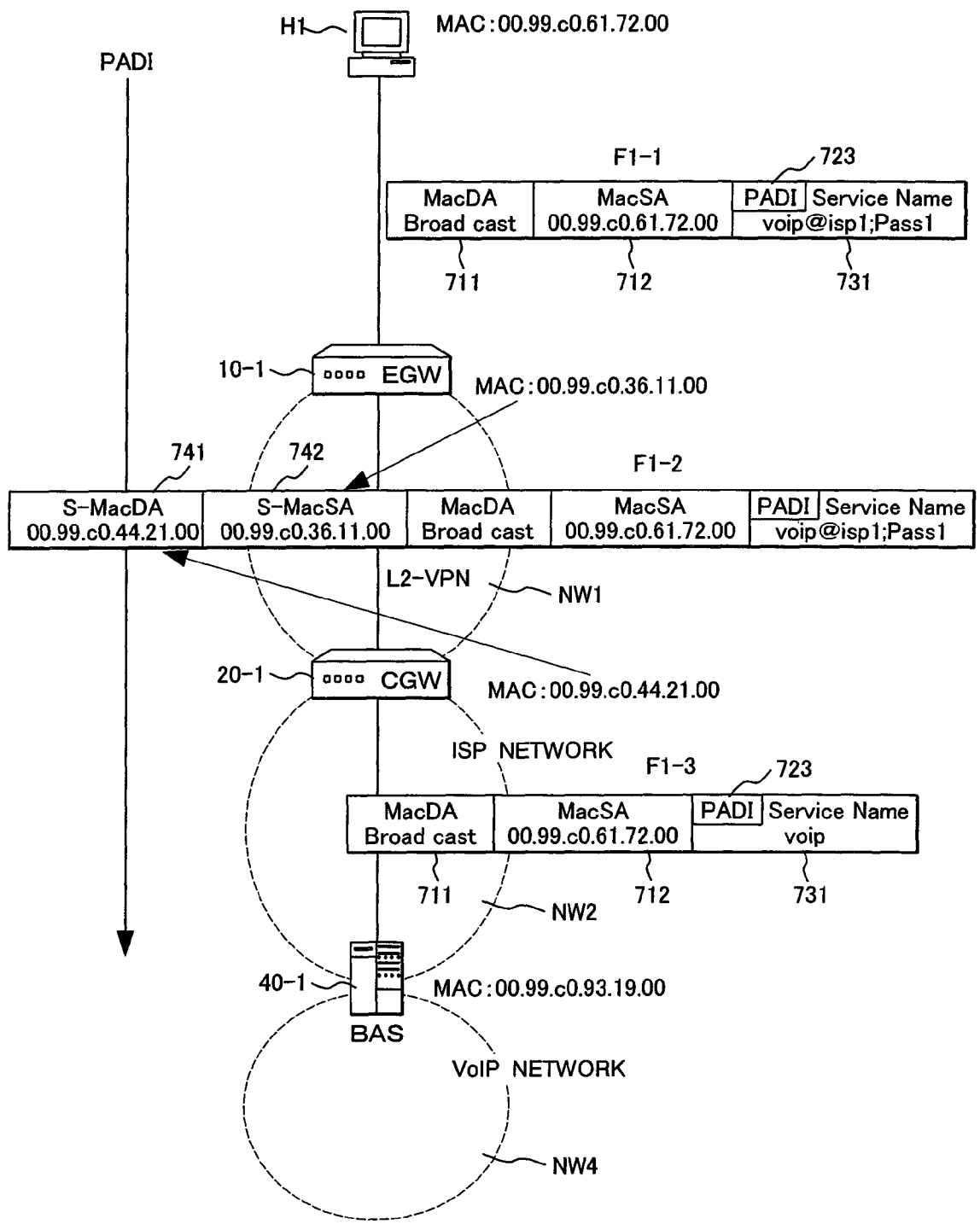
FIG. 14 is a view showing the process of format conversion of a PADI packet in the first embodiment.
Figure 15:
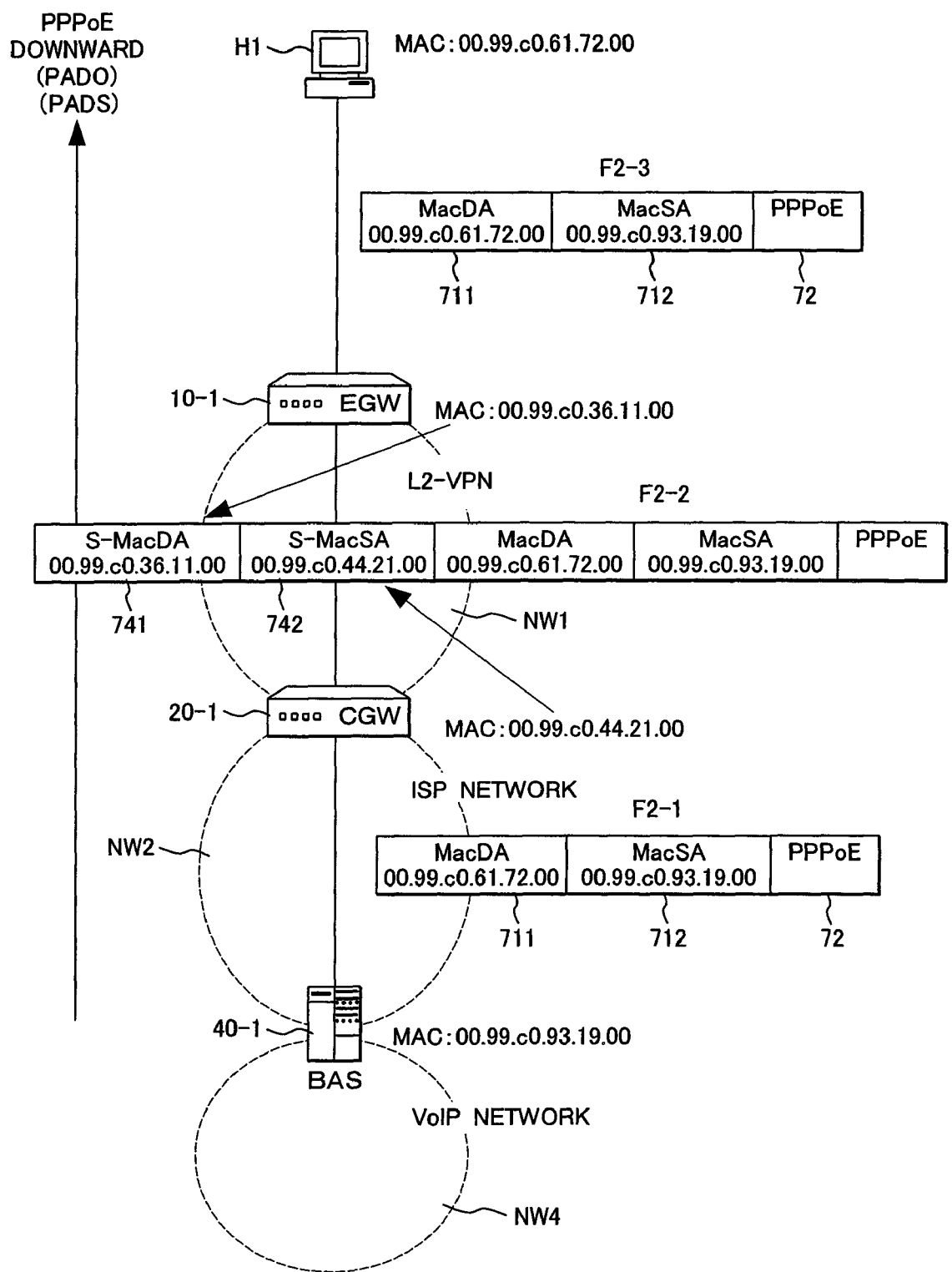
FIG. 15 is a view showing the process of format conversion of a PADO packet in the first embodiment.
Figure 16:
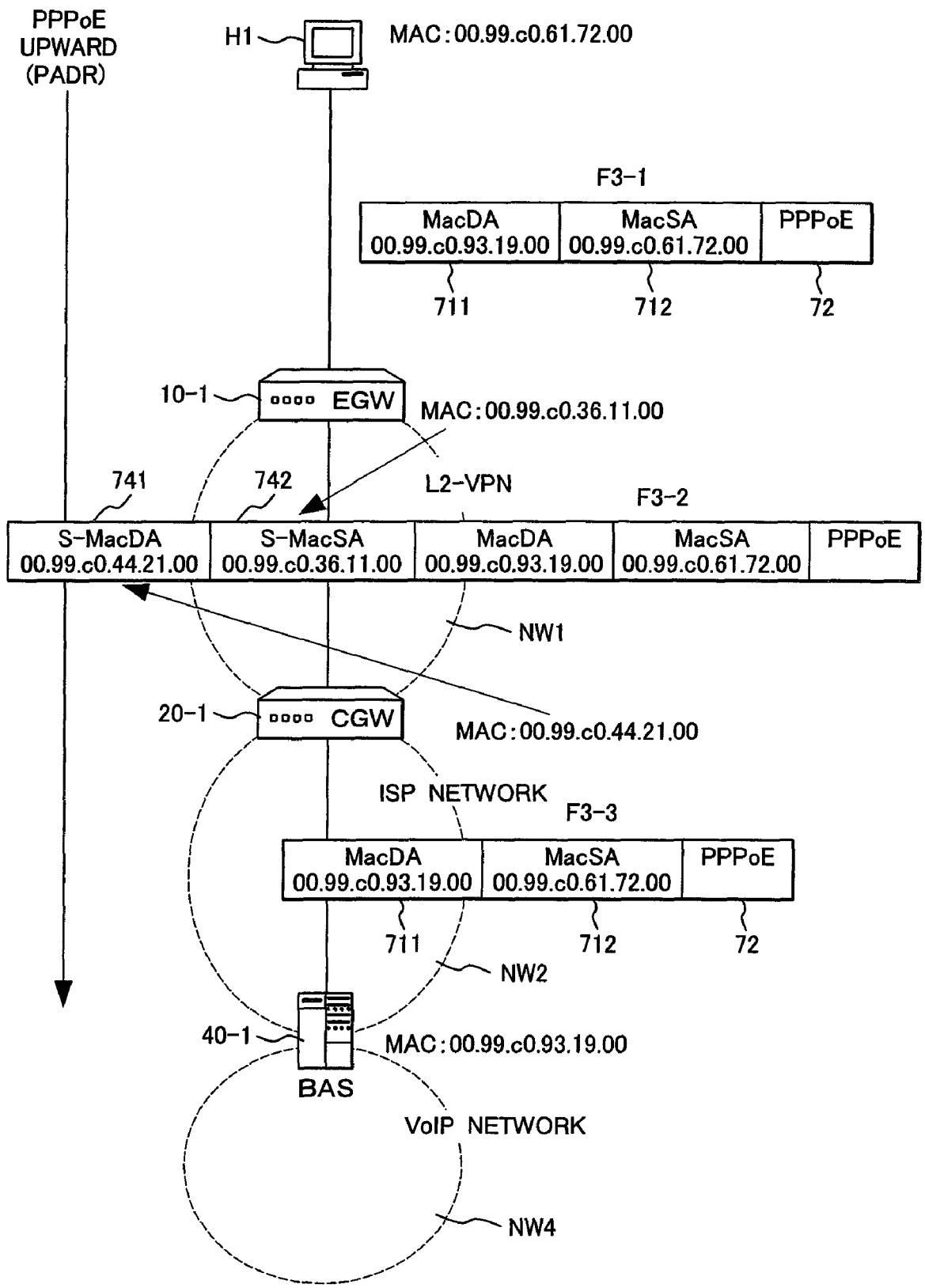
FIG. 16 is a view showing the process of format conversion of a PADR packet in the first embodiment.

FIG. 13 shows a communication sequence performed in the communication network shown in FIG. 1 when the user terminal H1 issues a packet PADI for requesting a connection with the VoIP network NW4. FIG. 14 shows the process of format conversion of the PADI packet in the first embodiment. FIGS. 15 and 16 show the processes of format conversion of a PADO packet and a PADR packet in the first embodiment, respectively.

Figure 17:
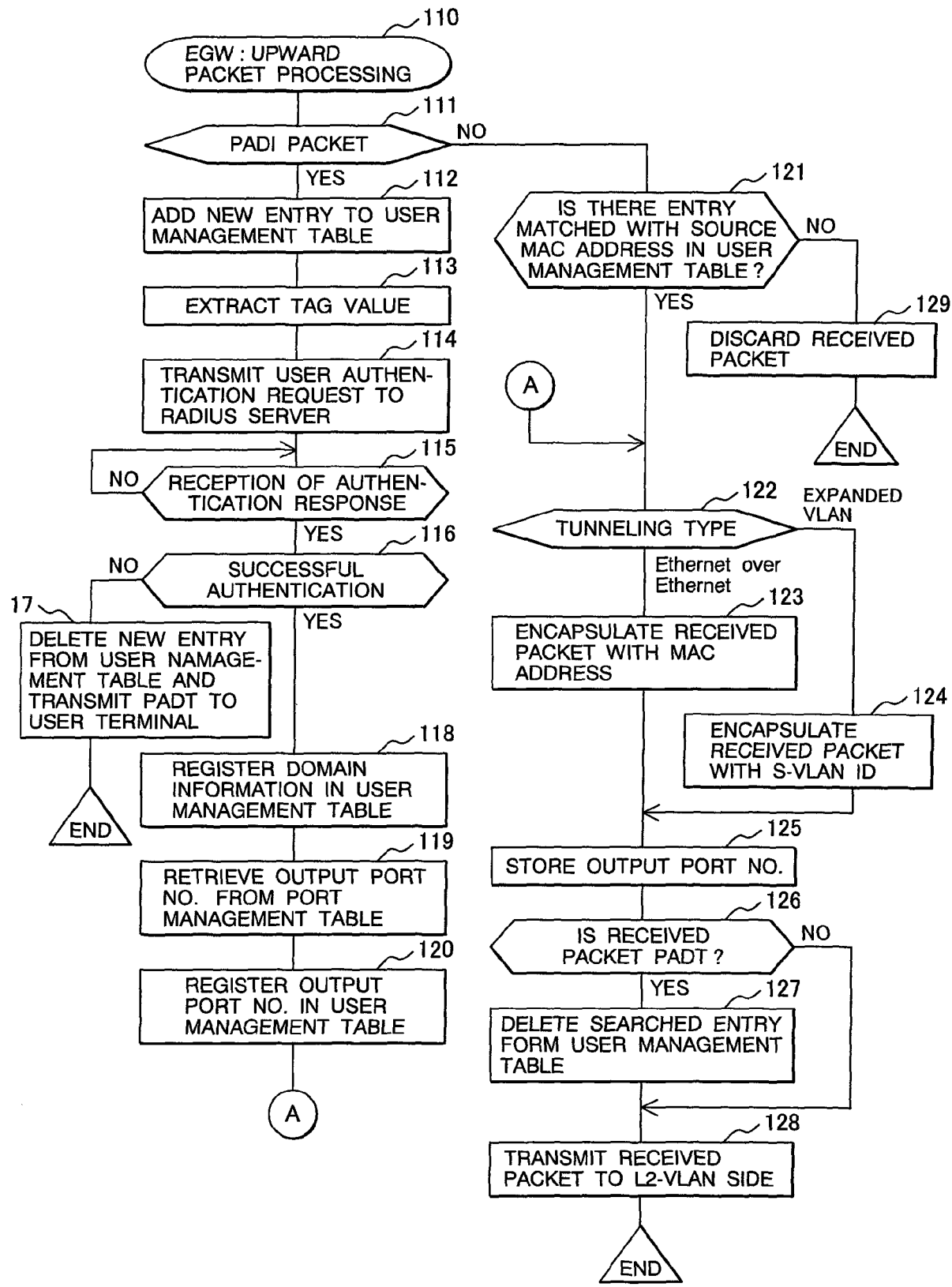
FIG. 17 is a flow chart showing an embodiment of an upward packet processing routine 110 to be executed by the EGW.
Figure 18:
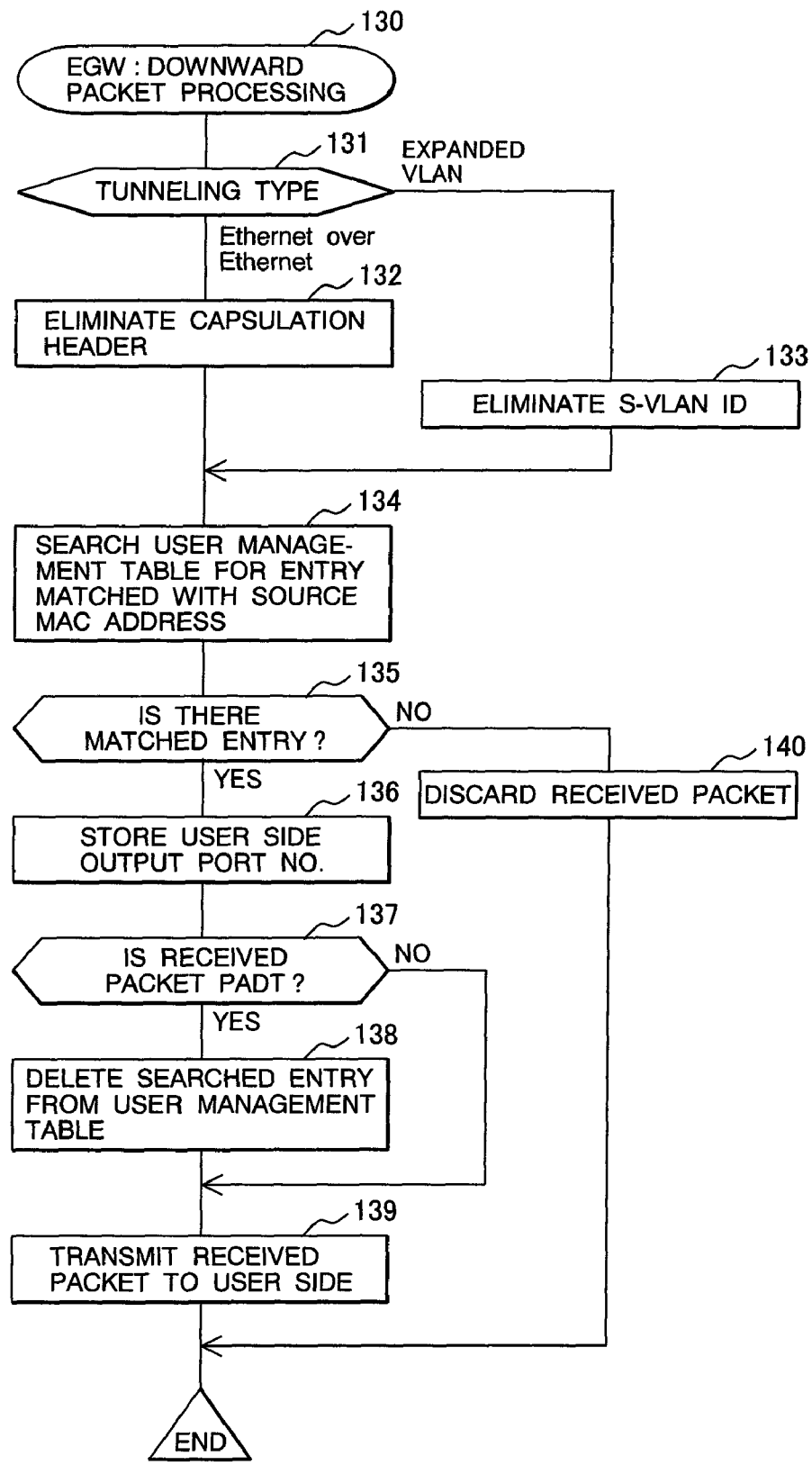
FIG. 18 is a flow chart showing an embodiment of a downward packet processing routine 130 to be executed by the EGW.
Figure 19:
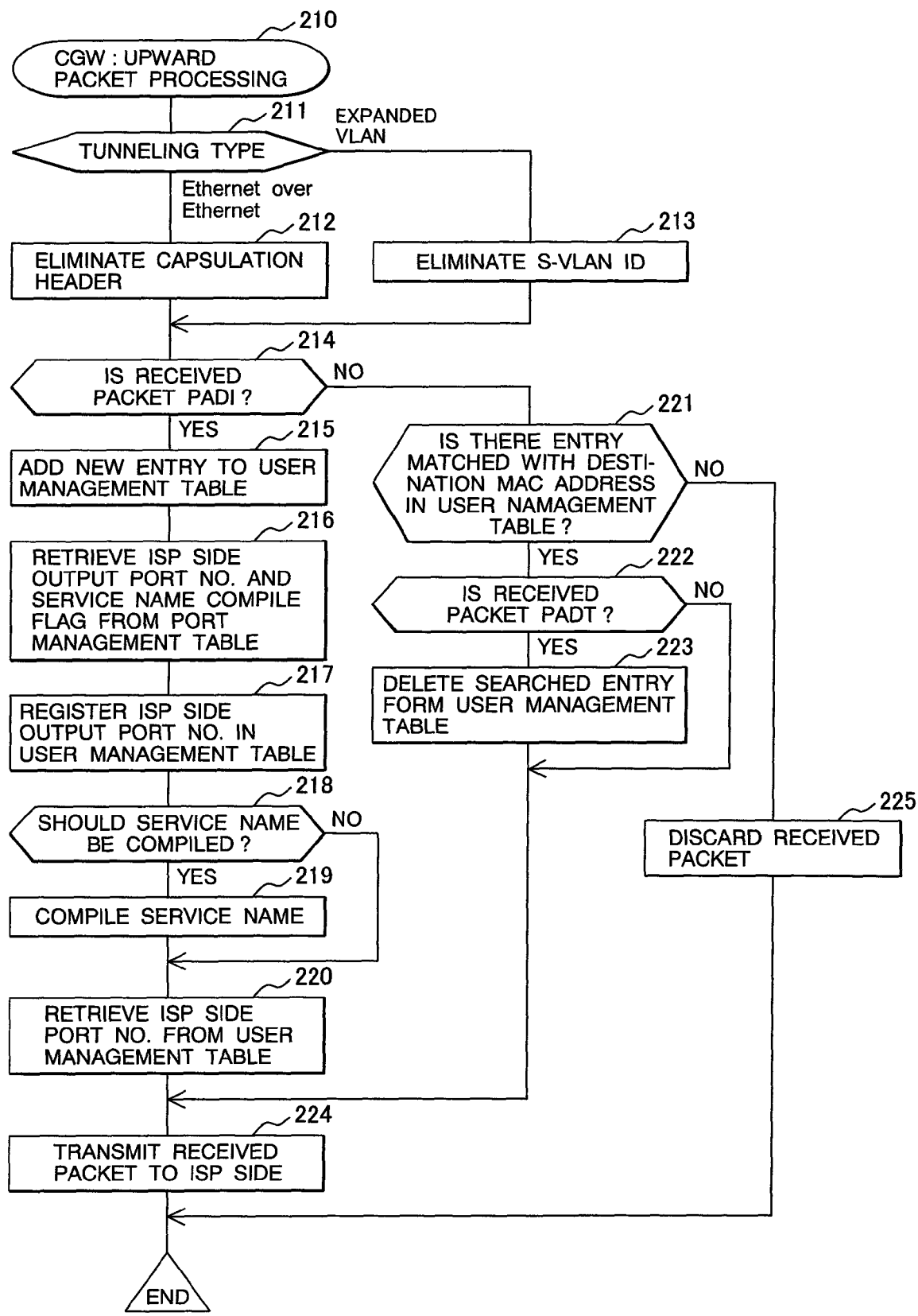
FIG. 19 is a flow chart showing an embodiment of an upward packet processing routine 210 to be executed by the CGW.
Figure 20:
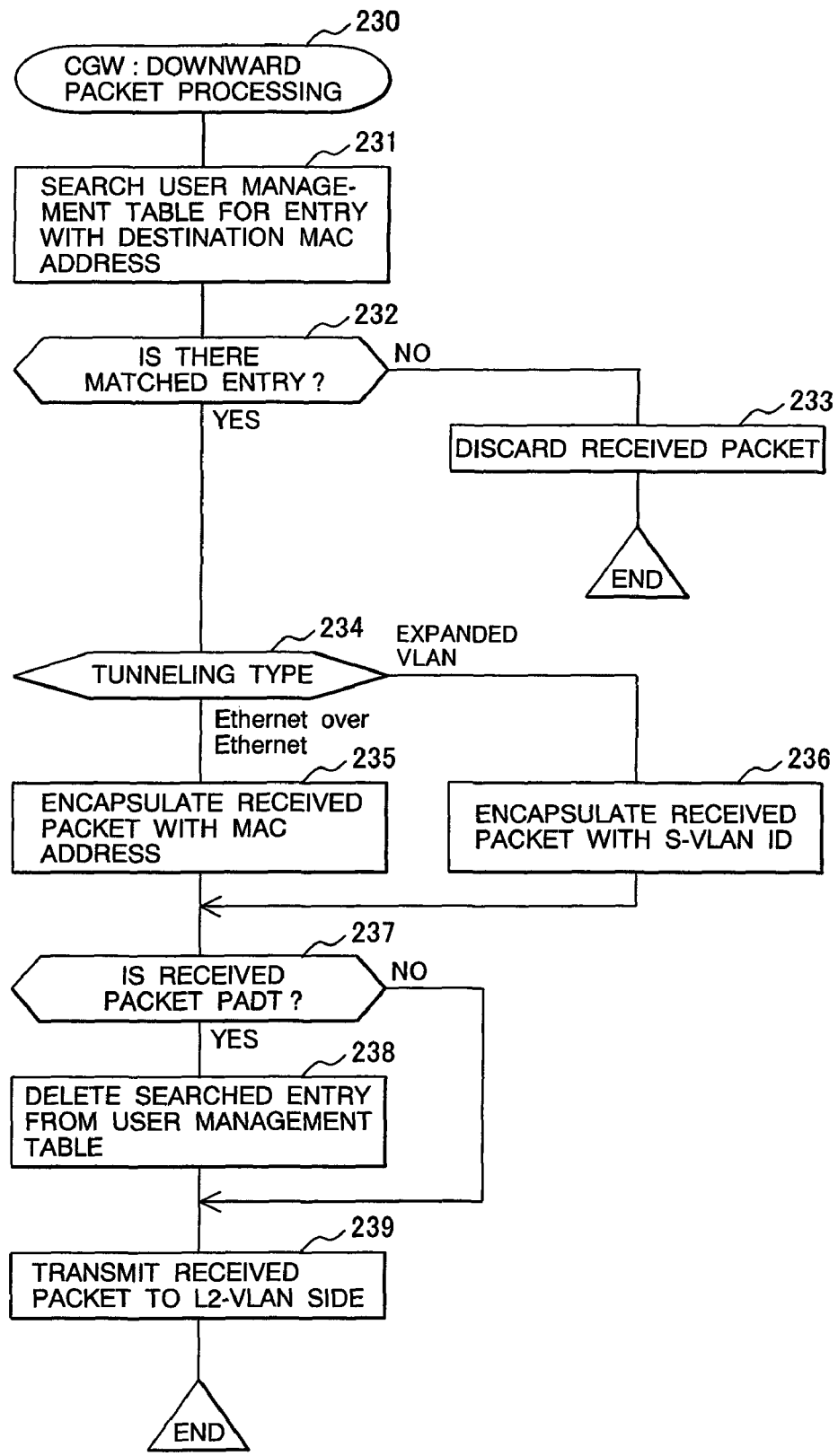
FIG. 20 is a flow chart showing an embodiment of a downward packet processing routine 230 to be executed by the CGW.

FIG. 17 is a flow chart of an upward packet processing routine 110 for packets received from the user terminal side to be executed by the EGW 10-1. FIG. 18 is a flow chart of a downward packet processing routine 130 for packets received from the L2-VPN network side to be executed by the EGW 10-1. FIG. 19 is a flow chart of an upward packet processing routine 210 for packets received from the L2-VPN network side to be executed by the CGW 20-1. FIG. 20 is a flow chart of a downward packet processing routine 230 for packets received from the ISP network side to be executed by the CGW 20-1.

The packet processing routines 110 and 130 executed by the EGW 10-1 are parts of the communication processing program 100, and the packet processing routines 210 and 230 executed by the CGW 20-1 are parts of the communication processing program 200.

When requesting a connection to the VoIP network NW4, the user terminal HI broadcasts a PADI packet specifying the service name "voip" with the TAG VALUE (SQ1-1 of FIG. 13). As shown by the format F1-1 in FIG. 14, the PADI packet includes a broadcast address in the destination MAC address (Mac DA) 711, the MAC address of the user terminal H1 in the source MAC address (MacSA) 712, "PADI" in the packet type code 723, and "voip@isp1;pass1" as the TAG VALUE in the TAG 731. In the TAG 731, "voip", "@isp1" and "pass1" indicate the service name, the domain name, and the password, respectively.

Upon receiving the PADI packet, the EGW 10-1 executes the upward packet processing routine 110 shown in FIG. 17 and determines whether the received PPPoE packet is a PADI packet or not (Step 111). In this example, since the received packet is the PADI packet, the EGW 10-1 adds a new table entry to the user management table 17 (112).

As shown by the entry 170-2 of FIG. 5A, the table entry includes the source MAC address "00.99.c0.61.72.00" of the received packet as the user MAC address 171 and the port number (which is "1" in this example) of a line interface 11-$i$ having received the PADI packet as the user side port number 177. When the layer 2 tunneling type is the Ethernet over Ethernet, the VLAN ID is not imparted to the PADI packet. Accordingly, the code "-" is set to the VALN ID 172 of the table entry.

After that, the EGW 20-1 extracts the TAG VALUE 7313: "voip@isp1;pass1" from the received packet (113), transmits a user authentication request message "Access-Request"

including the domain name "isp1" and the password "pass1", each extracted from the TAG VALUE to the Radius server 31 (114, SQ1-2 of FIG. 13), and awaits a response message indicating the authentication result from the Radius server 31 (115).

Upon receiving the Access-Request, the Radius server 31 searches the user management table 37 for a table entry 370-1 having the domain name "isp1" and compares the password 372 indicated by the table entry with the password "pass1" in the Access-Request.

When the password is normal, the Radius server 31 transmits to the EGW 10-1 an access permission message "Access-Accept" indicating successful user authentication as a response message to the Access-Request (SQ1-3). The Access-Accept includes the layer 2 tunneling type 373: "Ethernet over Ethernet", the CGW MAC address 376: "00.99.c0.44.21.00" and the EGW MAC address 375: "00.99.c0.36.11.00", each registered in the table entry 370-1 of the user management table 37. When the password shown by the Access-Request is not matched with the password 372 registered in the table entry 370-1, the Radius server 31 returns a response message indicating failed authentication.

Upon receiving the response message from the Radius server 31, the EGW 10-1 judges the result of the authentication (116). In the case of failed authentication, the EGW 10-1 deletes the new entry from the user management table, transmits a packet (PADT) for requesting the termination of PPP communication to the request source user terminal H1 (117), and terminates the routine.

When the response message from the Radius server 31 is the Access-Accept, the EGW 10-1 registers the layer 2 tunneling type: "Ethernet over Ethernet", the EGW MAC address: "00.99.c0.36.11.00" and the CGW MAC address: "00.99.c0.44.21.00" each shown by the received Access-Accept in the user management table (118). At this time, the table entry 170-2 is brought into the state shown in FIG. 5B. When the layer 2 tunneling type is "Ethernet over Ethernet", since the value of the VLAN ID between the EGW and the CGW is not included in the Access-Accept, the code "-" is set to the S-VLAN ID 174 of the table entry 170-2.

Then, the EGW 10-1 extracts the domain name "isp1" from the TAG VALUE 7313 of the PADI packet, retrieves the value "5" of the L2-VPN side port number 182 corresponding to the domain name "isp1" from the port management table 18 (119), and registers the retrieved port number "5" as the L2-VPN side port number 178 in the user management table 17 (120). As a result, the entry 170-2 of the user management table 17 is brought into the state shown in FIG. 5C.

Thereafter, the EGW 10-1 determines the layer 2 tunneling type 173 of the table entry 170-2 of the user management table 17 (122). In this example, the layer 2 tunneling type 173 is "Ethernet over Ethernet". Accordingly, the EGW 10-1 encapsulates the PADI packet by using the CGW MAC address 176 and the EGW MAC address 175 each indicated by the table entry 170-2 as the S-MacDA 741 and S-MacSA 742 of a capsulation header 74, as shown by the format F1-2 in FIG. 14 (123, SQ1-4 of FIG. 13).

The EGW 10-1 temporarily holds the value "5" of the L2-VPN side port number 178 indicated by the entry 170-2 of the user management table 17 in the work area of the memory 25 (125) and determines the type of the encapsulated packet (126). If the encapsulated packet (layer 2 tunneling packet) is a PADI packet as in this example, the EGW 10-1 transmits the encapsulated packet from the line interface having the port number "5" to the wide area Ethernet network L2-VPN (128, SQ1-5 of FIG. 13) and terminates the routine.

When the encapsulated packet is a PADT packet, for example, the EGW 10-1 deletes, from the user management table 17, the table entry having the user MAC address 171 matched with the destination MAC address or source MAC address of the PADT packet (127) and executes the transmission of the encapsulated packet to the L2-VPN (128).

The encapsulated PADI packet (layer 2 tunneling packet) is received by the L2SW 30-1. Upon receiving the layer 2 tunneling packet from the EGW 10-1, the L2SW 30-1 forwards the received packet to the CGW 20-1 in accordance with the destination MAC address "00.99.c0.44.21.00" (SQ1-6 of FIG. 13).

Upon receiving the layer 2 tunneling packet, the CGW 20-1 executes the upward packet processing routine 210 shown in FIG. 19 and determines the tunneling type of the received packet (211). In this example, since the tunneling type of the received packet is "Ethernet over Ethernet", the CGW 20-1 eliminates the capsulation header 74 form the received layer 2 tunneling packet (decapsulation 212, SQ1-7 of FIG. 13) and determines the type of the received packet (214). When the received packet is a PADI packet, the CGW 20-1 adds a new table entry having the source MAC address of the received PADI packet as the user MAC address 271 to the user management table 27.

The table entry 270-12 shown in FIG. 8A indicates the contents of the entry newly added to the user management table 27 at this time point. To the user MAC address 271, the MAC address "00.99.c0.61.72.00" of the user terminal H1 is set. To the layer 2 tunneling type 273, a code indicating "Ethernet over Ethernet" which is the tunneling type of the received packet is set. To the CGW MAC address 275 and the EGW MAC address 276, "00.99.c0.44.21.00" and "00.99.c0.36.11.00" indicated by the S-MacDA 741 and S-MacSA 742 of the capsulation header 74 are set, respectively. To the L2-VPN side port number 277, the port number "2" of the line interface having received the layer 2 tunneling packet is set.

In the layer 2 tunneling packet whose tunneling type is "Ethernet over Ethernet", since the values of the VLAN ID between the user terminal and the BAS and the VLAN ID ("S-VLAN ID") between the EGW and the CGW are not set, the code "-" is set to each of the VLAN ID 272 and S-VLAN ID 274 of the table entry 270-2.

Next, the CGW 20-1 retrieves the ISP side port number 282 and the service number compile flag 283 corresponding to the domain name "isp1" indicated by the TAG VALUE of the PADI packet from the port management table 28-1 shown in FIG. 10 (216) and registers the value of the retrieved ISP side port number, which is "5" in this example, as the ISP side port number 278 in the user management table 27-1 (217). As a result of this table updating, the table entry 270-2 is brought into the state shown in FIG. 8B.

The CGW 20-1 determines whether the service name should be compiled or not in accordance with the value of the retrieved service name compile flag 283 (218). In the port management table 28-1, the service name compile flag 283 of the table entry 280-11 corresponding to the domain name "isp1" is set to "1". Therefore, the CGW 20-1 analyzes "voip@isp1;pass1" indicated by the TAG VALUE of the PADI packet and eliminates the domain name "isp1" and the password information "pass1" from the TAG VALUE, whereby the received packet (PADI packet) is converted into a transmission packet which includes only the service name "voip" as the TAG VALUE, as shown by the format F1-3 in FIG. 14 (219, SQ1-8 of FIG. 13).

Thereafter, the CGW 20-1 retrieves the value "5" of the ISP side port number 278 corresponding to the source MAC address of the transmission packet from the user management table 27-1 (220), transmits the transmission packet to the ISP network from the line interface 21-5 having the ISP side port number "5" (224, SQ1-9 of FIG. 13), and terminates the routine.

The PADI packet transmitted from the CGW 20-1 to the ISP network is received by the BAS 40-1. Upon receiving the PADI packet, the BAS 40-1 replies a PADO packet as a response packet to the CGW 20-1 (SQ1-10 of FIG. 13). As shown by the format F2-1 in FIG. 15, the PADO packet includes the MAC address of the user terminal H1 as the destination MAC address 711 and the MAC address of the BAS 40-1 as the source MAC address 712.

Upon receiving the packet from the ISP network side, the CGW 20-1 executes the downward packet processing routine 230 shown in FIG. 20 and searches the user management table 27-1 for a table entry having the user MAC address 271 matched with the destination MAC address 711 of the received packet (231). As a result of the table search (232), if it was determined that the table entry matched with the destination MAC address is not found in the user management table 27-1, the CGW 20-1 discards the received packet (233) and terminates the routine.

In this example, the table entry 270-2 matched with the destination MAC address "00.99.c0.61.72.00" of the received packet (PADO) is retrieved from the user management table 27-1. Therefore, the CGW 20-1 determines the layer 2 tunneling type 273 of the retrieved table entry 270-2 (234). When the tunneling type is "Ethernet over Ethernet", the CGW 20-1 encapsulates the received packet by using the CGW MAC address 275 and the EGW MAC address 276 each indicated by the retrieved table entry to the capsulation header 74 (235, SQ1-11 of FIG. 13). By the encapsulation, the received packet (PADO) is converted into a transmission packet for layer 2 tunneling. As shown by the format F2-2 in FIG. 15, the transmission packet has the MAC address "00.99.c0.36.11.00" of the EGW 10-1 as the S-MacDA 741 and the MAC address "00.99.c0.44.21.00" of the CGW 20-1 as the S-MacSA 742.

Then, the CGW 20-1 determines whether the transmission packet is a PADT packet for requesting termination of PPP communication (237). When the transmission packet is a PADO packet as in this example, the CGW 20-1 transmits the packet from the line interface corresponding to the L2-VPN side port number 278 indicated by the table entry 270-2 of the user management table 27-1 (239, SQ1-12 of FIG. 13) and terminates the routine. If the transmission packet is a PADT packet, the CGW 20-1 executes Step 239 after deleting the retrieved table entry from the user management table 27-1 (238).

The PADO packet is forwarded to the L2SW 30-1 along a route reverse to the route of a PADI packet. Upon receiving a layer 2 tunneling packet from the CGW, the L2SW 30-1 forwards the received packet, in accordance with the destination MAC address 741 (which is "00.99.c0.36.11.00" in this example) of the capsulation header (SQ1-13 of FIG. 13), to the EGW 10-1.

Upon receiving the layer 2 tunneling packet from the L2-VPN side, the EGW 10-1 executes the downward packet processing routine 130 shown in FIG. 18 and determines the tunneling type of the received packet (131). In this example, since the tunneling type is "Ethernet over Ethernet", the EGW 10-1 eliminates the capsulation header 74 from the received packet (decapsulation 132, SQ1-14 of FIG. 13), whereby the L2 tunneling packet in the format F2-2 is converted into a PPPoE packet in the format F2-3, as shown in FIG. 15.

The EGW 10-1 searches the user management table 17 for a table entry having the user MAC address 171 matched with the destination MAC address 711 of the decapsulated received packet (134) and judges the result of the table search (135). If the table entry matched with the destination MAC address 711 is not found in the user management table 17, the EGW 10-1 discards the received packet (140), and terminates the routine.

In this example, since the table entry 170-2 matched with the destination MAC address "00.99.c0.61.72.00" of the received packet is retrieved from the user management table 17, the EGW 10-1 stores the value "1" of the user side port number 177 indicated by the table entry 170-2 in the work memory (136) and determines the type of the received packet (137). When the received packet is not a PPP communication termination request packet (PADT), the EGW 10-1 transmits the received packet from the line interface 11-1 having the user side port number "1" (139) and terminates the routine. As a result, the PADO packet replied from the BAS 40-1 is forwarded to the source user terminal H1 of the PADI packet (SQ1-15 of FIG. 13). If the received packet is a PADT packet, the EGW 10-1 executes Step 139 after deleting the retrieved table entry 170-2 from the user management table 17 (138).

Upon receiving the PADO packet, the user terminal H1 transmits a PADR, which is a PPP session initiation request packet (SQ1-16 of FIG. 13). As shown by the format F3-1 in FIG. 16, the Ethernet header of the PADR packet includes the destination MAC address 711 indicating the MAC address "00.99.c0.93.19.00" of the BAS 40-1.

Upon receiving the PADR packet, the EGW 10-1 executes the upward packet processing routine 110 shown in FIG. 17 and determines the type of the received packet (111). In this case, since the PADR packet is received, the EGW 10-1 determines whether a table entry matched with the source MAC address 712 ("00.99.c0.61.72.00") of the received packet has already registered in the user management table 17 (121). If the objective table entry has not been registered in the user management table 17, the EGW 10-1 discards the received packet (129) and terminates the routine.

In this example, the table entry 170-2 matched with the source MAC address "00.99.c0.61.72.00" has already been registered in the user management table 17, so that the EGW 10-1 determines the layer 2 tunneling type 173 of the table entry 170-2 (122). In this example, since the layer 2 tunneling type 173 of the table entry 170-2 is "Ethernet over Ethernet", the EGW 10-1 encapsulates the PADR packet by applying a capsulation header 74 including the CGW MAC address 176 and the EGW MAC address 175 each indicated by the entry 170-2 of the user management table to the S-MacDA 741 and the S-MacSA 742 (123, SQ1-17 of FIG. 13), thereby converting the PADR packet into a layer 2 tunneling packet, as shown by the format F3-2 in FIG. 16.

The EGW 10-1 temporarily holds the value "5" of the L2-VPN side port number 178 indicated by the entry 170-2 of the user management table 17 in the work area of the memory 25 (125) and determines the type of the layer 2 tunneling packet to be a transmission packet (126). When the transmission packet is a PADR packet as in this example, the EGW 10-1 transmits the packet from the I/O line interface having the port number "5" to the wide area Ethernet network (L2-VPN) (128, SQ1-18 of FIG. 13) and terminates the routine. The encapsulated PADR packet (layer 2 tunneling packet) is forwarded to the CGW 20-1 via the L2SW 30-1.

Upon receiving the layer 2 tunneling packet including the PADR packet, the CGW 20-1 executes the upward packet processing routine 210 shown in FIG. 19 and determines the tunneling type of the received packet (211). Since the tunneling type is "Ethernet over Ethernet" in this example, the CGW 20-1 eliminates the capsulation header 74 from the received layer 2 tunneling packet (decapsulation 212, SQ1-19 of FIG. 13), converts the received packet into the format F3-3 of FIG. 16, and determines the type of the packet (214).

If the received packet is a PADR packet, the CGW 20-1 determines whether a table entry having the user MAC address 271 matched with the source MAC address 712 ("00.99.c0.61.72.00") of the received packet has been already registered in the user management table 27-1 (221). When the objective table entry is not found in the user management table 27-1, the CGW 20-1 discards the received packet (225) and terminates the routine.

In this example, since the table entry 270-2 matched with the source MAC address "00.99.c0.61.72.00" of the received packet (PADR) is retrieved from the user management table 27-1, the CGW 20-1 determines the type of the received packet to be a transmission packet (222). When the packet is a PADR packet as in this example, the CGW 20-1 transmits the packet from the line interface 21-5 having the ISP side port number "5" (224, SQ1-20 of FIG. 13) and terminates the routine. If the packet to be transmitted is a PADT packet, the CGW 20-1 executes Step 224 after deleting the retrieved entry from the user management table 27-1 (223).

The PADR packet is received by the BAS 40-1 specified by the destination MAC address of the packet. Upon receiving the PADR packet, the BAS 40-1 replies a PADS packet, which is a response packet to the PADR packet, to the source user terminal H1 of the PADR packet (SQ1-21 of FIG. 13). The PADS packet has the format shown by F2-1 in FIG. 15, similarly to the PADO described above.

Upon receiving the PADS packet, the CGW 20-1 executes the downward packet processing routine 230 shown in FIG. 20 and searches the user management table 27-1 for a table entry having the user MAC address 271 matched with the destination MAC address of the received packet (231).

In this example, since the table entry 270-2 matched with the destination MAC address "00.99.c0.61.72.00" of the received packet (PADS) is retrieved from the user management table 27-1, the CGW 20-1 determines the layer 2 tunneling type 273 of the retrieved table entry 270-2 (234). The tunneling type is "Ethernet over Ethernet." Then, the CGW 20-1 encapsulates the received packet by applying the CGW MAC address 275 and the EGW MAC address 276, each indicated by the retrieved table entry, to the capsulation header 74 (235, SQ1-22 of FIG. 13).

By the encapsulation, the received packet (PADS) is converted into a layer 2 tunneling packet to be a transmission packet having the MAC address "00.99.c0.36.11.00" of the EGW 10-1 as the S-MacDA 741 and the MAC address "00.99.c0.44.21.00" of the CGW 20-1 as the S-MacSA 742, as shown by the format F2-2 in FIG. 15.

After that, the CGW 20-1 determines whether the transmission packet is a PADT packet indicating a PPP communication termination request (237). When the transmission packet is a PADS packet as in this example, the CGW 20-1 transmits the packet from the line interface corresponding to the L2-VPN side port number 278 indicated by the table entry 270-2 of the user management table 27-1 (239, SQ1-12 of FIG. 13) and terminates the routine. As a result, the PADS packet is forwarded to the L2SW 30-1 along a route reverse to the route of a PADR packet and forwarded to the EGW 10-1 by the L2SW 30-1.

Upon receiving the above PADO packet, the EGW 10-1 executes the downward packet processing routine 130 shown in FIG. 18 and determines the tunneling type of the received packet (131). Since the tunneling type is "Ethernet over Ethernet" in this example, the EGW 10-1 eliminates the capsulation header 74 from the received packet (132, SQ1-24 of FIG. 13), whereby the received packet in the format F2-2 is converted into a packet in the format F2-3, as shown in FIG. 15.

The EGW 10-1 searches the user management table 17 for a table entry having the user MAC address 171 matched with the destination MAC address 711 of the decapsulated received packet (134). In this example, since the table entry 170-2 matched with the destination MAC address "00.99.c0.61.72.00" of the received packet is retrieved from the user management table 17, the EGW 10-1 stores the value "1" of the user side port number 177 indicated by the table entry 170-2 in the work memory (136) and determines the type of the received packet (137). In this case, since the received packet is not a PADT packet, the EGW 10-1 transmits the received packet from the line interface 11-1 having the user side port number "1" (139) and terminates the routine. As a result, the PADS packet replied from the BAS 40-1 is forwarded to the source user terminal H1 of the PADR packet (SQ1-25 of FIG. 13).

Upon receiving the user packet from the user side (or L2-VPN side), the EGW 10-1 encapsulates (or decapsulates) the received packet in accordance with the packet processing routine 110 (or 130) described above and forwards the encapsulated (or decapsulated) packet to the L2-VPN network (or access network). Likewise, upon receiving the user packet from the L2-VPN side (or LSP side), the CGW 20-1 also decapsulates (or encapsulates) the received packet in accordance with the packet processing routine 210 (or 230) described above and forwards the decapsulated (or encapsulated) packet to the LSP network (or L2-VPN network).

When the EGW 10-1 (or CGW 20-1) receives a PADT packet, which is a PPP communication termination requesting packet, from the user side (or the ISP side), the EGW forwards the received PADT packet to the CGW 20-1 (or EGW 10-1) and deletes the table entry matched with the source MAC address (or destination MAC address) of the PADT packet from its user management table 17 (or 27-1) (127, 138, 223, and 238).

Second Embodiment

Next, a description will be given as a second embodiment of the present invention in the case where layer 2 tunneling of expanded LAN type using a S-VLAN ID is performed between the EGW and the CGW.

The system configuration and management tables assumed in the second embodiment are the same as in the first embodiment.

Figure 21:
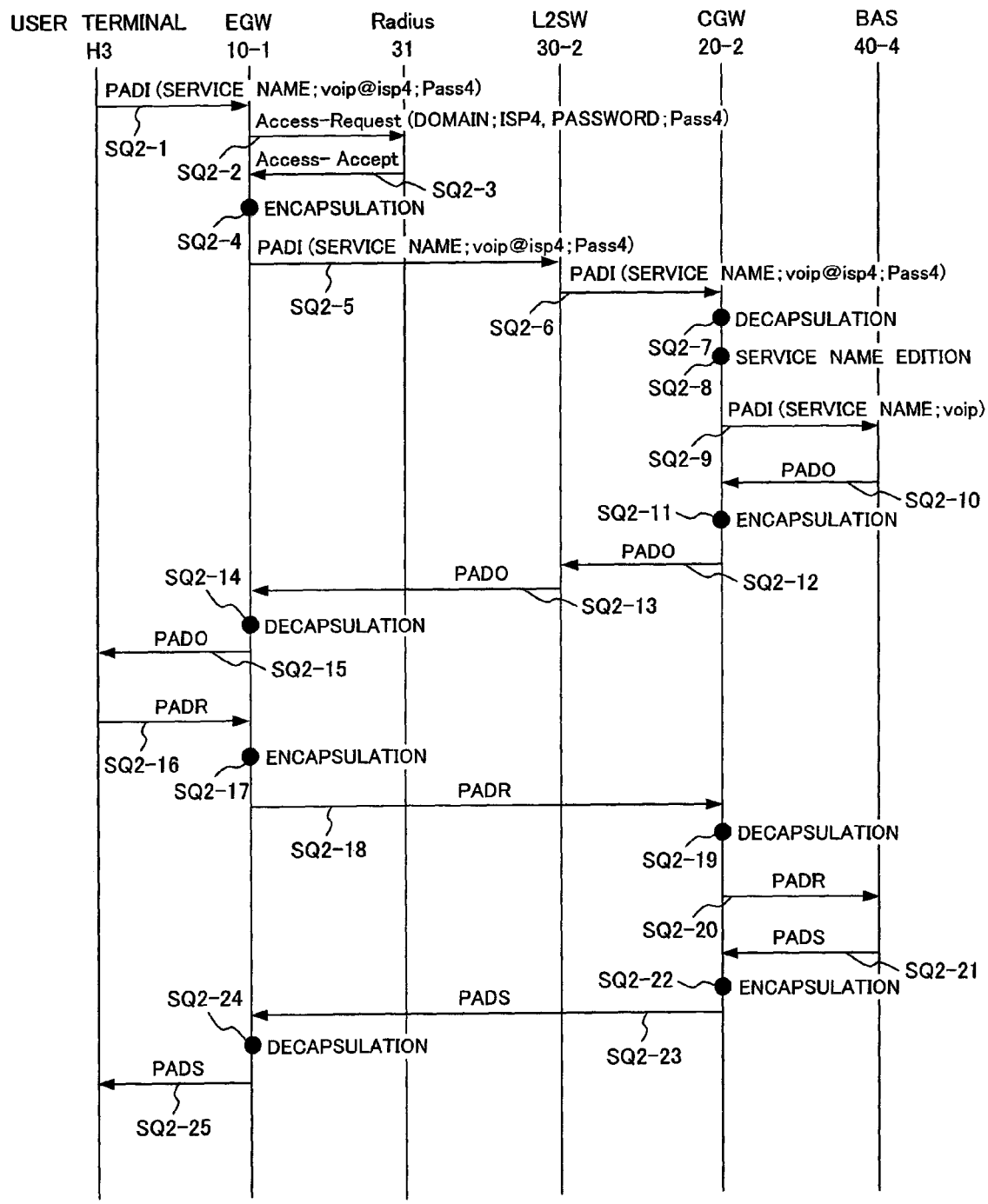
FIG. 21 is a communication sequence diagram showing a second embodiment of the present invention.
Figure 22:
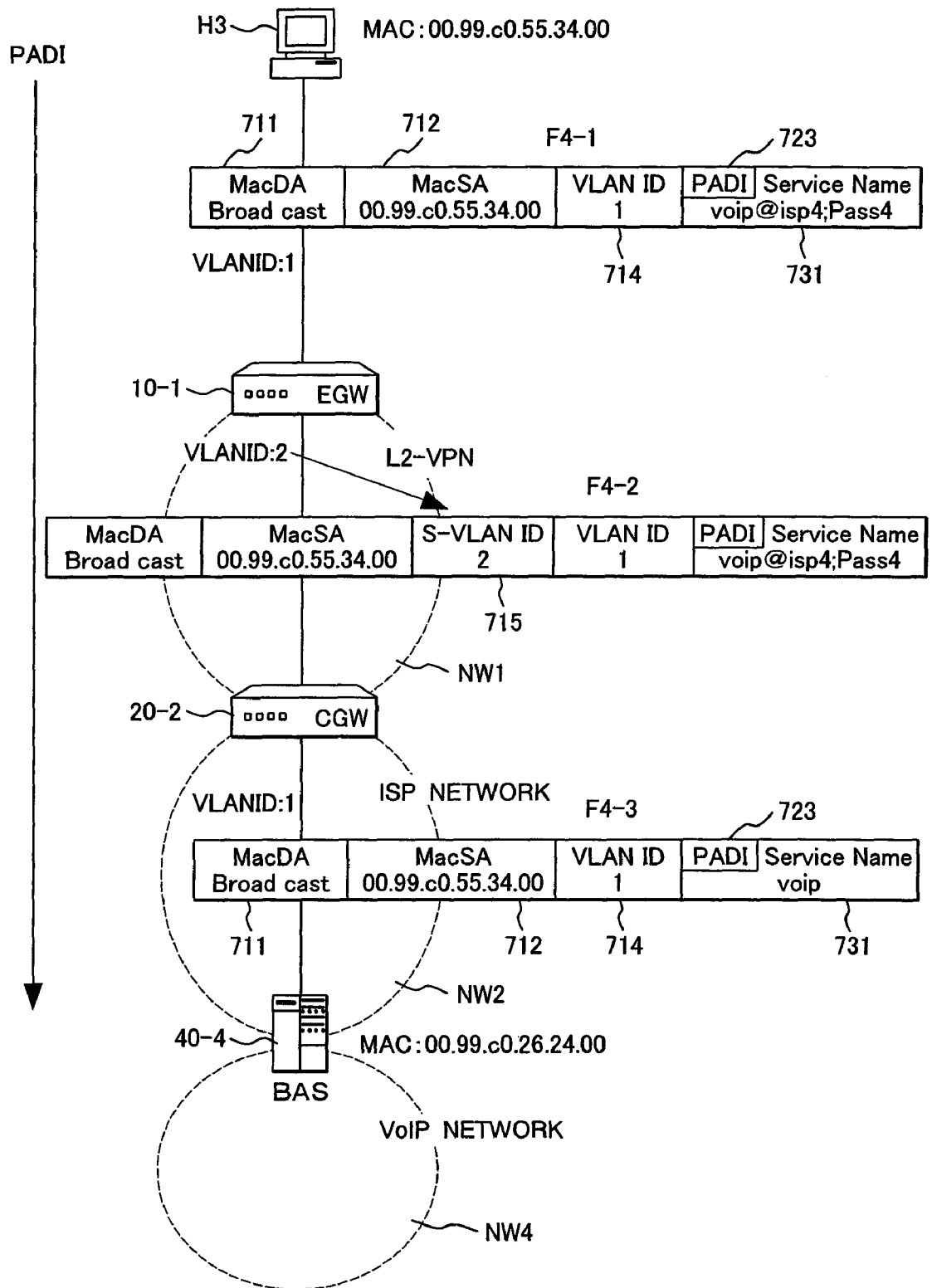
FIG. 22 is a view showing the process of format conversion of a PADI packet in the second embodiment.
Figure 23:
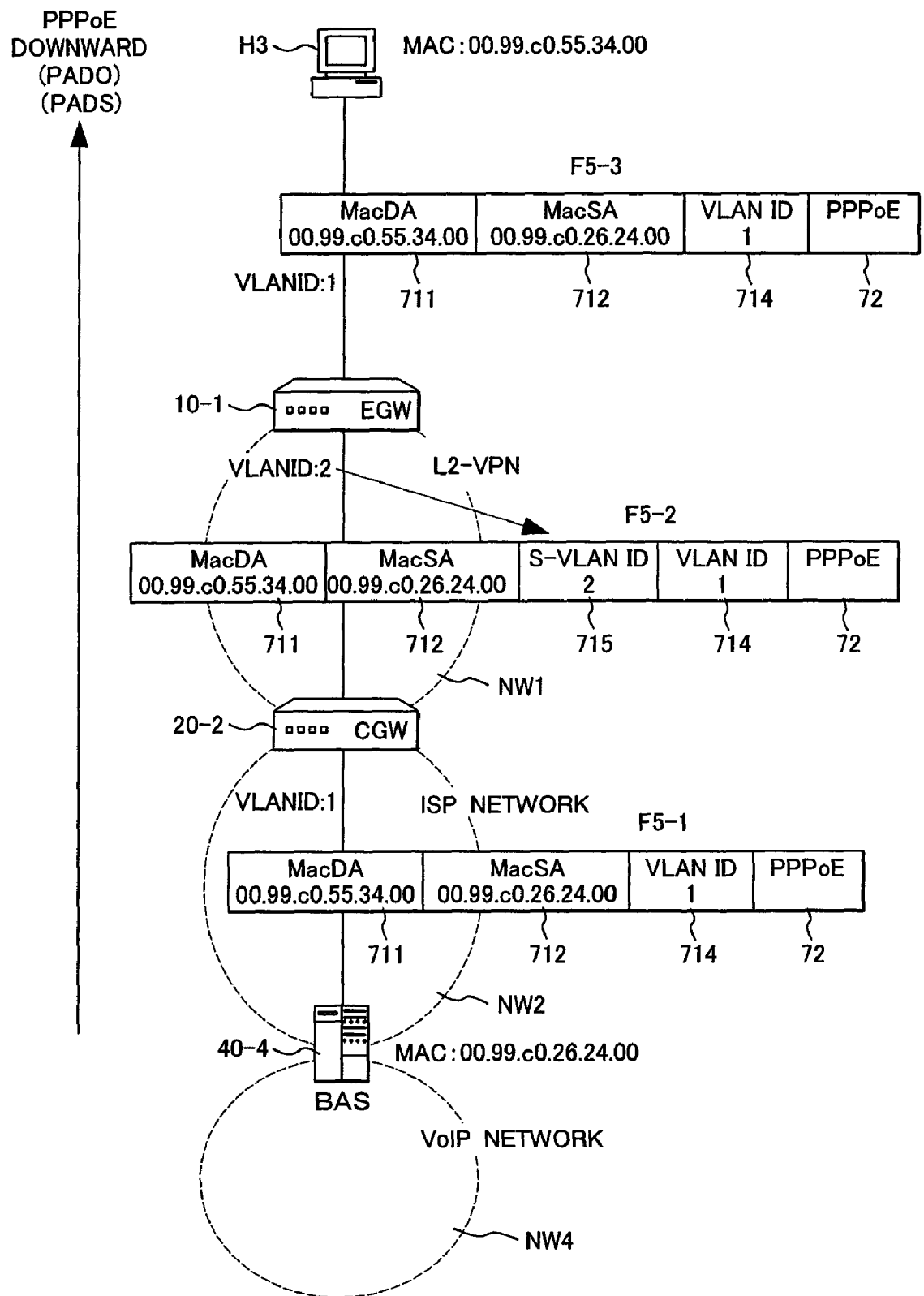
FIG. 23 is a view showing the process of format conversion of a PADO packet in the second embodiment.
Figure 24:
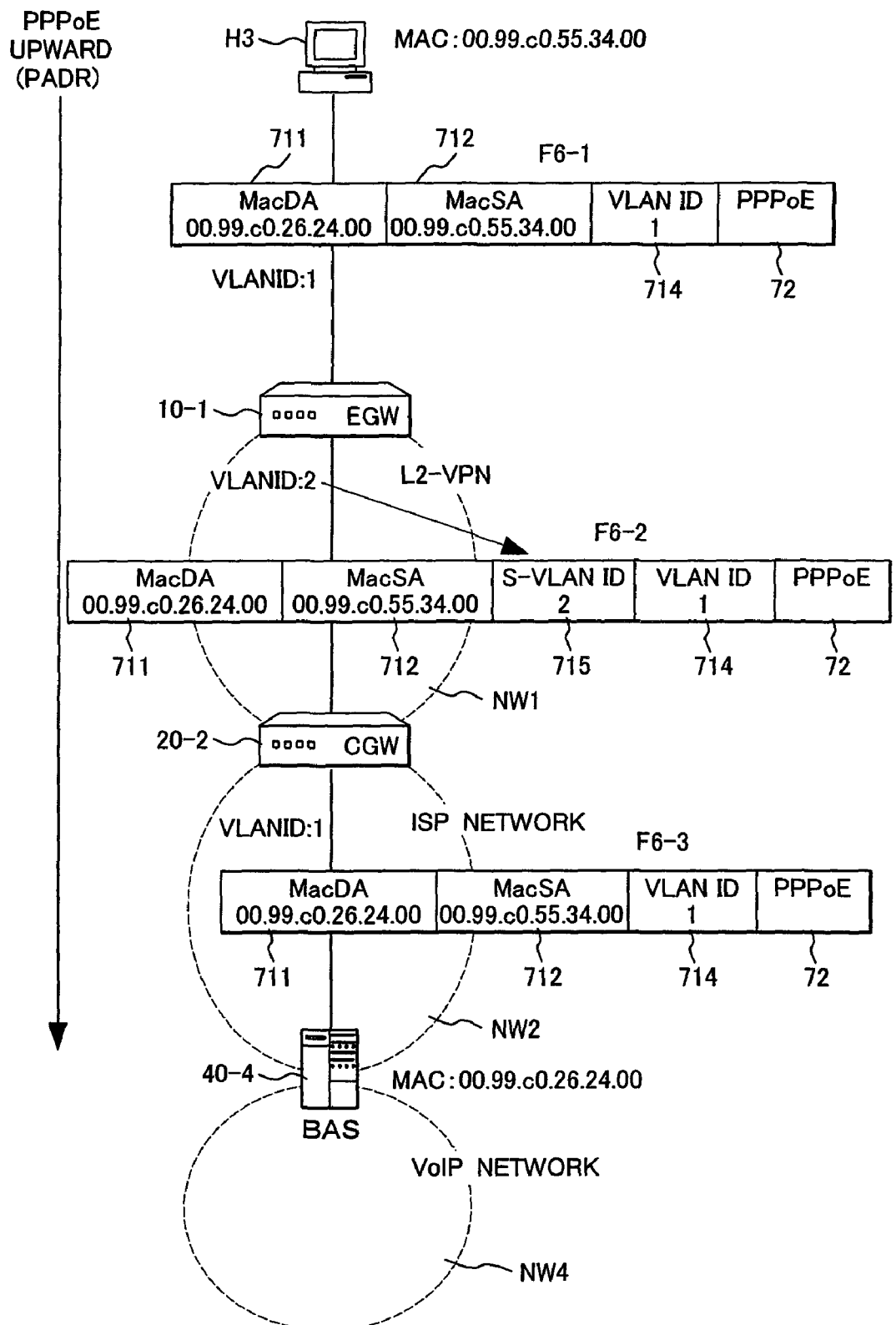
FIG. 24 is a view showing the process of format conversion of a PADR packet in the second embodiment.

FIG. 21 shows a communication sequence performed in the communication network shown in FIG. 1 when the user terminal H3 issues a packet PADI for requesting a connection to the VoIP network NW4. FIG. 22 shows the process of format conversion of the PADI packet in the second embodiment. FIGS. 23 and 24 show the processes of format conversion of a PADO packet and a PADR packet in the second embodiment, respectively.

When requesting a connection to the VoIP network, the user H3 broadcasts a PADI packet which includes, as shown by the format P4-1 in FIG. 22, the ID value "1" as the VLAN ID 714 and a value "voip@isp4;pass4" showing the service name, the domain name and the password in the TAG VALUE 7313 (SQ2-1 of FIG. 21).

Upon receiving the PADI packet, the EGW 10-1 executes the upward packet processing routine 110 shown in FIG. 17 and determines the type of the received PPPoE packet (111).

Since the received packet is the PADI packet, the EGW 10-1 additionally registers a new table entry in the user management table 17 (112).

As shown in the entry 170-3 of FIG. 5D, the table entry includes the source MAC address "00.99.c0.55.34.00" indicated by the received PADI packet as the user MAC address 171, the port number (which is "3" in this example) of the line interface 11-*i* having received the PADI packet as the user side port number 177, and the ID value "1" specified by the received packet as the VLAN ID 172.

Thereafter, the EGW 10-1 extracts the TAG VALUE 7313 voip@isp4;pass4% from the received packet (112), transmits a user authentication request message "Access-Request" including the domain name "isp4" and the password "pass4", each extracted from the TAG VALUE, to the Radius server 31 (114, SQ2-2 of FIG. 21), and waits for a response from the Radius server 31 (115).

The Radius 31 performs user authentication as performed in the first embodiment. In this example, a table entry 370-2 having the domain name "isp4" is retrieved from the user management table 37. This table entry specifies "expanded VLAN" with the layer 2 tunneling type 373 and the ID value "2" with the S-VLAN ID 374. When the password is normal, the Radius 31 replies to the EGW 10-1 an access permission message "Access Accept" indicating that the layer tunneling type is "expanded VLAN" and the value of the S-VLAN ID is "2" (SQ2-3 of FIG. 21).

Upon receiving the response packet "Access-Accept" from the Radius server 31, the EGW 10-1 judges the result of the authentication (116). If the response packet is the Access Accept, the EGW 10-1 registers the layer 2 tunneling type "expanded VLAN" and the value "2" of the S-VLAN ID, each indicated by the received Access-Accept in the table entry 170-3 of the user management table (118). When the layer 2 tunneling type is the expanded VLAN, the EGW MAC address and the CGW MAC address are not specified in the Access-Accept. In this case, the code "-" is set to each of the EGW MAC address 175 and the CGW MAC address 176 in the table entry 170-3. At this time point, the table entry 170-3 is brought into the state shown in FIG. 5E.

Next, the EGW 10-1 extracts the domain name "isp4" from the TAG VALUE 7313 of the PADI packet, retrieves the value "6" as the L2-VPN side port number 182 corresponding to the domain name "isp4" from the port management table 18 (119), and registers the retrieved port number "6" as the L2-VPN side port number 178 in the user management table 17 (120). This brings the table entry 170-3 into the state shown in FIG. 5F.

Thereafter, the EGW 10-1 determines the layer 2 tunneling type 173 of the table entry 170-3 (122). In this example, since the tunneling type is the expanded VLAN, the EGW 10-1 encapsulates the received packet with the capsulation header (Ethernet header 74) including the S-VLAN ID 715, whereby the received packet is converted into a layer 2 tunneling packet (124), as shown by the format F4-2 in FIG. 22.

The EGW 10-1 temporarily holds the value "6" of the L2-VPN side port number 178 indicated by the entry 170-3 of the user management table 17 in the work area of the memory 25 (125) and determines the type of the layer 2 tunneling packet to be a transmission packet (126). When the layer 2 tunneling packet is a PADI packet as in this example, the EGW 10-1 transmits the packet to the wide area Ethernet network (L2-VPN) from the I/O line interface having the port number "6" (128, SQ2-5 of FIG. 21) and terminates the routine.

The PADI packet is forwarded to the CGW 20-2 by a L2SW 30-2. Upon receiving the layer 2 tunneling packet, the CGW 20-2 executes the upward packet processing routine 210 shown in FIG. 19 and determines the tunneling type of the received packet (211).

In this example, since the tunneling type of the received packet is the expanded VLAN, the CGW 20-2 eliminates the S-VLAN ID 715 from the header of the received packet (213, SQ2-7 of FIG. 21) and determines the type of the received packet while storing the value "2" of the S-VLAN ID 715 in a work memory area (214). In this example, since the received packet is the PADI packet, the CGW 20-2 adds a new table entry including the source MAC address of the received PADI packet as the user MAC address 271 to the user management table 27-2 (215).

The contents of the table entry added to the user management table 27-2 at this time point is shown as an entry 270-22 in FIG. 9A. To the user MAC address 271, the MAC address "00.99.c0.55.34.00" of the user terminal H3 indicated by the source MAC address of the PADI packet is set. To the VLAN ID 272, the value "1" of the VLAN ID 714 indicated by the received packet is set. To the layer 2 tunneling type 273, the code indicating the expanded VLAN is set. To the S-VLAN ID 274, the value "2" of the S-VLAN ID 715 indicated by the received packet is set. To the L2-VPN side port number 277, the port number of the line interface having received the layer 2 tunneling packet, which is "3" in this example, is set. In this example, as the values of CGW MAC address and the EGW MAC address are not specified in the layer 2 tunneling packet, the code "-" is set to each of the CGW MAC address 275 and the EGW MAC address 276.

Next, the CGW 20-2 retrieves the ISP side port number 282 corresponding to the domain name "isp4" indicated by the TAG VALUE of the PADI packet and the service name compile flag 283 from the port management table 28-2 shown in FIG. 11 (216) and registers the retrieved ISP side port number (which is "8" in this example) as the ISP side port number 278 in the table entry 270-22 of the user management table (217). This brings the table entry 270-22 into the state shown in FIG. 9B.

The CGW 20-1 determines whether the service name should be compiled or not from the value of the retrieved service name compile flag 283 (218). In the port management table 28-2, since the service name compile flag 283 is set to "1" in the table entry 280-22 corresponding to the domain name "isp4", the CGW 20-2 analyzes "voip@isp4;pass4" in the TAG VALUE of the PADI packet and eliminates the domain name "isp4" and the password information "pass4" from the TAG VALUE, thereby converting the received packet (PADI packet) into a transmission packet including the service name "voip" as the TAG VALUE, as shown by the format F4-3 in FIG. 14 (219, SQ2-8 of FIG. 21).

Thereafter, the CGW 20-2 retrieves the value "8" of the ISP side port number 278 corresponding to the source MAC address of the transmission packet from the user management table 27-2 (220), transmits the packet from the line interface 21-8 having the ISP side port number "8" to the ISP network (224, SQ2-9 of FIG. 21), and terminates the routine.

The PDI packet is received by the BAS 40-4. In response to the received PADI packet, the BAS 40-4 transmits a PADO packet (SQ2-10 of FIG. 21). As shown by the format F5-1 in FIG. 23, the PADO packet includes the MAC address "00.99.c0.55.34.00" of the source user terminal H3 of the PADI packet as the destination address 711, the MAC address "00.99.c0.26.24.00" of the BAS 40-4 as the source MAC address 712, and the same ID value "1" as the ID value of the PADI packet as the VLAN ID 714.

Upon receiving the PADO packet, the CGW 20-2 executes the downward packet processing routine 230 shown in FIG.

20 and searches the user management table 27-2 for a table entry having the user MAC address 271 matched with the destination MAC address of the received packet (231). In this example, the table entry 270-22 having the value "00.99.c0.55.34.00" as the user MAC address 271 is retrieved from the user management table 27-2. Then, the CGW 20-2 determines the layer 2 tunneling type 273 of the retrieved table entry 270-22 (234). In this case, since the tunneling type is the expanded VLAN, the CGW 20-2 encapsulates the PADO packet by using the value "2" specified by the S-VLAN ID 274 in the table entry 270-22 (236, SQ2-11 of FIG. 21). The encapsulation performed here means, as shown by the format F5-2 in FIG. 23, to convert the PADO packet into a layer 2 tunneling packet to be a transmission packet in a form obtained by adding the S-VLAN ID 717 to the Ethernet header.

The CGW 20-2 determines the type of the transmission packet (237). If the transmission packet is not a PADT packet, the CGW 20-2 transmits the packet from the line interface corresponding to the L2-VPN side port number 278 ("3") indicated by the table entry 270-22 retrieved from the user management table 27-2 (239, SQ2-12 of FIG. 21) and terminates the routine. As a result, the PADO packet is forwarded to the L2SW 30-2 along a route reverse to the route of a PADI packet.

Upon receiving the layer 2 tunneling packet from the CGW 20-2, the L2SW 30-2 forwards the received packet to the EGW 10-1 in accordance with the S-VLAN ID (SQ2-13 of FIG. 21). When the layer 2 tunneling packet is received, the EGW 10-1 executes the downward packet processing routine 130 shown in FIG. 18 and determines the tunneling type of the received packet (131). In this example, since the tunneling type is the expanded VLAN, the EGW 10-1 eliminates the S-VLAN ID 715 from the received packet (decapsulation 133, SQ2-14 of FIG. 21). By the decapsulation, the layer 2 tunneling packet is converted into a PPPoE packet to be a transmission packet shown by the format F5-3 in FIG. 23.

Thereafter, the EGW 20-1 searches the user management table 17 for a table entry having the user MAC address 171 matched with the destination MAC address 711 of the transmission packet (134) and judges the result of the table search (135). This time in the example, since the table entry 170-3 is retrieved from the user management table 17, the EGW 10-1 stores the port number "3" indicated by the user side port number 177 in the work memory (136) and determines the type of the transmission packet (137). If the transmission packet is not a PADT packet, the EGW 10-1 transmits the packet from the line interface having the port number "3" (139, SQ2-15 of FIG. 21) and terminates the routine. As a result, the PADO packet is forwarded to the source user terminal H3 of the PADI packet.

Upon receiving the PADO packet, the user terminal H3 transmits a PADR packet which is a PPP session initiation request packet (SQ2-16 of FIG. 21). As shown by the format F6-1 in FIG. 24, the PADR packet has the MAC address of the BAS 40-4 as the destination MAC address 711 of the Ethernet header and the same value "1" as the PADI packet in the VLAN ID 714.

upon receiving the PADR packet, the EGW 10-1 executes the upward packet processing routine 110 shown in FIG. 17 and determines the type of the received packet (111). In this case, since the received packet is not a PADI packet, the EGW 10-1 determines whether a table entry having the user MAC address 171 matched with the source MAC address 712 of the received has been already registered in the user management table 17 (121).

Since the table entry 170-3 matched with the source MAC address "00.99.c0.55.34.00" of the received packet has been already registered in the user management table 17, the EGW 10-1 determines the layer 2 tunneling type 173 of the retrieved table entry 170-3 (122). In this example, since the layer 2 tunneling type is the expanded VLAN, the EGW 10-1 encapsulates the received packet by using the ID value "2" specified by the S-VLAN ID 174 of the table entry 170-3 (124, SQ2-17 of FIG. 21), whereby the received packet is converted into a layer 2 tunneling packet to be a transmission packet. The encapsulation performed here means to add the S-VLAN ID 715 to the Ethernet header, as shown by the format P6-2 in FIG. 24.

Thereafter, the EGW 10-1 temporarily holds the value "6" of the L2-VPN side port number 178 indicated by the entry 170-3 of the user management table 17 in the work area of the memory 25 (125) and determines the type of the layer 2 tunneling packet (126). If the layer 2 tunneling packet to be a transmission packet is a PADR packet as in this example, the EGW 10-1 transmits the packet to the wide area Ethernet network (L2-VPN) from the line interface having the port number "6" (128, SQ21-18 of FIG. 21) and terminates the routine. The layer 2 tunneling packet (PADR) is forwarded to the CGW 20-2 via the L2SW 30-2.

Upon receiving the layer 2 tunneling packet, the CGW 20-2 executes the upward packet processing routine 210 shown in FIG. 19 and determines the tunneling type of the received packet (211). In this example, since the tunneling type of the received packet is the expanded VLAN, the CGW 20-2 eliminates the S-VLAN ID 715 from the received packet (decapsulation 213), converts the received packet into a transmission packet (PPPoE packet) having the format F6-3 of FIG. 23, and determines the type of the packet (214).

When the transmission packet is a PADR packet, the CGW 20-2 retrieves a table entry having the user MAC address 271 matched with the source MAC address 712 of the received packet from the user management table 27-2 (221). As a result of the table retrieval, if the table entry 270-22 matched with the source MAC address "00.99.c0.55.34.00" is found, the CGW 20-2 determines whether the transmission packet is a PADT packet (223). In this example, since the transmission packet is the PADR packet, the CGW 20-2 transmits the packet from the line interface having the port number "8" specified by the ISP side port number 278 of the table entry 270-22 (224, SQ2-21 of FIG. 21) and terminates the routine.

The PADR packet is received by the BAS (40-4). Upon receiving the PADR packet, the BAS 40-4 replies a PADS packet as a response packet to the PADR packet (SQ2-21 of FIG. 21). As shown by the format F5-1 in FIG. 23, the source MAC address 711 of the PADS packet includes the MAC address "00.99.c0.55.34.00" of the user terminal H3.

Upon receiving the PADS packet from the BAS 40-4, the CGW 20-2 executes the downward packet processing routine 230 shown in FIG. 20 and retrieves a table entry having the user MAC address 271 matched with the destination MAC address 712 of the received packet from the user management table 27-2 (231). Since the table entry 270-22 matched with the destination MAC address "00.99.c0.55.34.00" is retrieved, the CGW 20-2 determines the layer 2 tunneling type 273 of the table entry 270-22 in the same manner as on receiving a PADO packet (234) and encapsulates the PADS packet by using the S-VLAN ID 274 indicated in the table entry 270-22 (236, SQ2-22 of FIG. 21), whereby the PADS packet is converted into a layer 2 tunneling packet shown by the format F5-2 in FIG. 23.

The CGW 20-2 transmits the layer 2 tunneling packet from the line interface corresponding to the L2-VPN side port number 278 ("3") indicated by the table entry 270-2 (239) and terminates the routine. As a result, the PADS packet is forwarded to the L2SW 30-2 along a route reverse to the route of a PADR packet and transmitted to the EGW 10-1 by the L2SW 30-2 (SQ2-23 of FIG. 21).

Upon receiving the PADS, the EGW 10-1 executes the downward packet processing routine 130 shown in FIG. 18. In the same manner as on receiving a PADO packet, the EGW 10-1 determines the tunneling type of the received packet (131), eliminates the S-VLAN ID 715 from the received packet (decapsulation 133, SQ2-24 of FIG. 21), searches the user management table 17 for the table entry 170-3 (134), transmits the packet with the format F5-3 of FIG. 23 from the line interface having the port number "3" (139, SQ2-25 of FIG. 21), and terminates the routine. As a result, the PADS packet is forwarded to the source user terminal H3 of the PADR packet.

When a PADT packet, which is a PPP communication termination request packet, is received from the user side (or the ISP side), the EGW 10-1 (or CGW 20-2) forwards the received PADT packet to the CGW 20-2 (or EGW 10-1) as a counterpart apparatus and deletes the table entry matched with the source MAC address (or destination MAC address) of the PADT packet from the user management table 17 (27-2) of the apparatus of its own.

In each of the embodiments described above, an L2-VPN can be set between the EGW and the CGW by adding a new table entry to the user management table when either of the EGW and the CGW receives a PADI packet for requesting a connection in a PPPoE protocol. In the case of a network to which the IEEE 802.1X is applied, it becomes possible to set the L2-VPN between the EGW and the CGW by adding a new table entry to the user management table when an EAP-Response/ID notification packet is received.

Although the description has been given to the case where the type of layer 2 tunneling type in the L2-VPN is the Ethernet over Ethernet or the expanded VLAN in each of the foregoing embodiments, the present invention is also applicable to other layer 2 tunneling types such as, e.g., L2TPv3 and Ethernet over IP.

What is claimed is:

1. A packet forwarding control method in a wide area Ethernet network having an edge side packet forwarding apparatus coupled with a plurality of access lines for communicating with user terminals; a plurality of core side packet forwarding apparatuses; and an authentication server storing, in association with corresponding Internet service provider (ISP) domain names, layer 2 tunneling control information including a tunneling type and header information to be applied to a capsulation header corresponding to the tunneling type, each of said core side packet forwarding apparatuses being connected to at least one gateway apparatus of an ISP which is identifiable by one of said ISP domain names and controls a connection between each of the user terminals belonging to the ISP and a layer 3 network, the packet forward control method comprising the steps of:

transmitting from said edge side packet forwarding apparatus to said authentication server when a connection request packet for requesting a connection with the layer 3 network has been received from one of said user terminals, a user authentication request message including an ISP domain name and user authentication information each extracted from the connection request packet;

replying from said authentication server having received the user authentication request message to said edge side packet forwarding apparatus a response message including the layer 2 tunneling control information corresponding to the ISP domain name specified by the user authentication request message when user authentication succeeded;

causing said edge side packet forwarding apparatus having received the response message to register in a first user management table a new table entry indicating the correspondence between a source address of said connection request packet and the layer 2 tunneling control information extracted from the response message, determine the tunneling type in the layer 2 tunneling control information, encapsulate the connection request packet by applying the header information specified in the layer 2 tunneling control information to a capsulation header in accordance with the tunneling type, and transmit the encapsulated connection request packet as a layer 2 tunneling packet to said wide area Ethernet network; and causing one of said core side packet forwarding apparatuses having received said connection request packet in the form of the layer 2 tunneling packet to determine the tunneling type of the connection request packet based on the capsulation header, decapsulate the received packet in accordance with the tunneling type, register in a second user management table a new table entry indicating the correspondence between a source address of the connection request packet and the layer 2 tunneling control information including the tunneling type and the header information of the capsulation header of the layer 2 tunneling packet and forward the decapsulated connection request packet to the gateway apparatus associated with the core side packet forwarding apparatus.

2. The packet forwarding control method according to claim 1, further comprising the steps of:

retrieving by said core side packet forwarding apparatus, when a packet destined to the user terminal has been received from the gateway apparatus, a table entry matched with a destination address of the received packet from said second user management table to encapsulate the received packet in accordance with the tunneling type by applying the header information in the layer 2 tunneling control information specified in the table entry to a capsulation header, and transmitting the encapsulated packet as a layer 2 tunneling packet to said wide area Ethernet network; and decapsulating by said edge side packet forwarding apparatus the layer 2 tunneling packet received from said core side packet forwarding apparatus in accordance with the tunneling type determined based on the capsulation header and forwarding the decapsulated packet to said user terminal corresponding to the destination address of the packet.

3. The packet forwarding control method according to claim 2, wherein, said core side packet forwarding apparatus discards the packet received from said gateway apparatus when the table entry matched with the destination address of the received packet is not found in said second user management table.

4. The packet forwarding control method according to claim 1, wherein said edge side packet forwarding apparatus retrieves, when a packet other than the connection request packet for requesting a connection with said layer 3 network has been received from said user terminal, a table entry matched with a source address of the received packet from said first user management table, encapsulates the received packet by applying the header information in the layer 2 tunneling control information indicated in the table entry to a capsulation header in accordance with the layer 2 tunneling type in the layer 2 tunneling control information, and transmits the encapsulated packet as a layer 2 tunneling packet to said wide area Ethernet network; and one of said core side packet forwarding apparatuses having received the layer 2 tunneling packet determines the tunneling type of the received packet based on the capsulation header, decapsulates the received packet in accordance with the tunneling type and forwards the decapsulated packet to said gateway apparatus associated with the core side packet forwarding apparatus.

5. The packet forwarding control method according to claim 4, wherein said edge side packet forwarding apparatus discards the packet received from said user terminal when the table entry matched with the source address of the received packet is not found in said first user management table.

6. The packet forwarding control method according to claim 2, wherein said edge side packet forwarding apparatus stores a port number indicating one of said access lines having received said connection request packet in said new table entry to be registered in said first user management table, and forwards a packet obtained by decapsulating said layer 2 tunneling packet received from said core side packet forwarding apparatus to one of said access lines specified by the port number indicated in the table entry matched with the destination address of the packet.

7. The packet forwarding control method according to claim 2, wherein each of said table entries in said first and second user management tables includes, as said header information, an identifier of a virtual LAN formed between said edge side packet forwarding apparatus and one of said core side packet forwarding apparatuses or a pair of layer 2 addresses assigned to the edge side packet forwarding apparatus and the core side packet forwarding apparatuses;

said edge side packet forwarding apparatus encapsulates packets received from each of said access lines by using the header information in the layer 2 tunneling control information indicated in the table entry retrieved from the first user management table to said capsulation header in accordance with the tunneling type in the layer 2 tunneling control information; and said core side packet forwarding apparatus encapsulates packets received from said gateway apparatus by using the header information in the layer 2 tunneling control information indicated in the table entry retrieved from the second user management table to said capsulation header in accordance with the tunneling type in the layer 2 tunneling control information.

8. The packet forwarding control method according to claim 1, wherein at least one of said core side packet forwarding apparatuses is connected to a plurality of gateway apparatuses each identified by a service name and forwards, when a layer 2 tunneling packet having a packet header including the ISP domain name and the service name was received from said wide area Ethernet network, a packet obtained by decapsulating the layer 2 tunneling packet to the gateway apparatus specified by the service name.

9. A packet forwarding apparatus coupled to a plurality of access lines for communicating with user terminals and connected to a wide area Ethernet network including a plurality of core side packet forwarding apparatuses each connected to a layer 3 network through a gateway apparatus identifiable by an ISP (Internet Service Provider) domain name, and an authentication server storing, in association with the ISP domain names, layer 2 tunneling control information including a tunneling type and header information to be applied to a capsulation header corresponding to the tunneling type, the packet forwarding apparatus comprising:

means for transmitting to said user authentication server when a connection request packet for requesting a connection with the layer 3 network has been received from one of said user terminals through one of said access lines, a user authentication request message including an ISP domain name and user authentication information each extracted from the connection requests packet, and receiving from the authentication server a response message indicating layer 2 tunneling control information corresponding to the ISP domain name specified by the user authentication request message, the layer 2 tunneling control information including a tunneling type and header information to be applied to a capsulation header corresponding to the tunneling type;

means for storing a new table entry indicating the correspondence between a source address of the connection request packet and the layer 2 tunneling control information extracted from the response message in a user management table;

means for encapsulating the connection request packet in by applying the header information specified in the layer 2 tunneling control information to a capsulation header in accordance with the tunneling type specified in layer 2 tunneling control information, and transmitting the connection request packet as a layer 2 tunneling packet to one of said core side packet forwarding apparatuses through said wide area Ethernet network;

means for retrieving, when a packet other than the connection request packet for requesting a connection with the layer 3 network has been received from one of said user terminals, a table entry matched with a source address of the received packet from said user management table, encapsulating the received packet with by applying the header information in the layer 2 tunneling control information indicated in the table entry to a capsulation header in accordance with the tunneling type in the layer 2 tunneling control information, and transmitting the packet as a layer 2 tunneling packet to one of said core side packet forwarding apparatuses through said wide area Ethernet network; and means for decapsulating, when a layer 2 tunneling packet has been received from said wide area Ethernet network, the layer 2 tunneling packet in accordance with the tunneling type determined based on the capsulation header of the layer 2 tunneling packet, and forwarding a decapsulated packet to one of said user terminals corresponding to a destination address of the packet.

10. A packet forwarding apparatus, connected to at least one gateway apparatus of an ISP (Internet Service Provider) network and a wide area Ethernet network, for decapsulating a layer 2 tunneling packet transmitted from one of a plurality of edge side packet forwarding apparatuses connected to the wide area Ethernet network to forward a decapsulated packet to the gateway apparatus, and for encapsulating a packet received from the gateway apparatus with a capsulation header to forward a layer 2 tunneling packet to one of said edge side packet forwarding apparatuses through the wide area Ethernet network, the packet forwarding apparatus comprising:

means for registering in a user management table, when a layer 2 tunneling packet transmitted from a user terminal has been received from one of said edge side forwarding apparatuses through the wide area Ethernet network, the layer 2 tunneling packet including a connection request packet for requesting a connection with a layer 3 network which is connected to the wide area Ethernet network through the packet forwarding apparatus and said gateway apparatus, a new table entry indicating the correspondence between a source address of the connection request packet and layer 2 tunneling control information including a tunneling type and header information corresponding to the tunneling type determined from the capsulation header of the received packet, and forwarding the connection request packet obtained by the decapsulating layer 2 tunneling packet in accordance with the tunneling type to said gateway apparatus; and means for retrieving, when a packet was received from the gateway apparatus, a table entry matched with a destination address of the received packet from said user management table, encapsulating the received packet by applying the header information in the layer 2 tunneling control information indicated in the table entry to a capsulation header in accordance with the tunneling type in the layer 2 tunneling control information, and transmitting the encapsulated packet as a layer 2 tunneling packet to one of said edge side packet forwarding apparatuses through the wide area Ethernet network.

* * * * *